(12) United States Patent
Urushihara et al.

(10) Patent No.: US 10,331,054 B2
(45) Date of Patent: Jun. 25, 2019

(54) ELECTROPHOTOGRAPHIC MEMBER, PROCESS CARTRIDGE AND ELECTROPHOTOGRAPHIC IMAGE FORMING APPARATUS

(71) Applicant: CANON KABUSHIKI KAISHA, Tokyo (JP)

(72) Inventors: Shohei Urushihara, Suntou-gun (JP); Masaki Yamada, Mishima (JP); Takashi Koyanagi, Mishima (JP); Hideya Arimura, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 87 days.

(21) Appl. No.: 15/493,282

(22) Filed: Apr. 21, 2017

(65) Prior Publication Data

US 2017/0329251 A1   Nov. 16, 2017

(30) Foreign Application Priority Data

May 11, 2016   (JP) .................... 2016-095346

(51) Int. Cl.
*G03G 15/00* (2006.01)
*G03G 15/02* (2006.01)
*H04N 1/60* (2006.01)
*G03G 15/16* (2006.01)
*G03G 9/097* (2006.01)

(52) U.S. Cl.
CPC ........ *G03G 15/0233* (2013.01); *H04N 1/6027* (2013.01); *B32B 2333/04* (2013.01); *G03G 9/09716* (2013.01); *G03G 9/09783* (2013.01); *G03G 15/1605* (2013.01); *G03G 2215/025* (2013.01)

(58) Field of Classification Search
CPC ........... G03G 9/09783; G03G 15/0233; G03G 2215/025; G03G 9/09716; G03G 15/1605; B32B 2333/04; H04N 1/6027
See application file for complete search history.

(56) References Cited

U.S. PATENT DOCUMENTS

| | | | |
|---|---|---|---|
| 4,840,778 A | 6/1989 | Arai et al. | |
| 7,627,276 B2 | 12/2009 | Anan et al. | |
| 7,797,833 B2 | 9/2010 | Nakamura et al. | |
| 7,799,398 B2 | 9/2010 | Nakamura et al. | |
| 8,529,806 B2 | 9/2013 | Kawamura et al. | |
| 8,600,273 B2 | 12/2013 | Yamada et al. | |
| 8,655,222 B2 | 2/2014 | Nakamura et al. | |
| 8,655,238 B2 | 2/2014 | Uno et al. | |
| 8,706,011 B2 | 4/2014 | Anan et al. | |
| 8,768,226 B2 | 7/2014 | Koyanagi et al. | |
| 8,768,227 B2 | 7/2014 | Urushihara et al. | |
| 8,774,677 B2 | 7/2014 | Sakurai et al. | |
| 8,798,508 B2 | 8/2014 | Yamada et al. | |
| 8,837,985 B2 | 9/2014 | Ishida et al. | |
| 8,846,287 B2 | 9/2014 | Yamada et al. | |
| 8,874,007 B2 | 10/2014 | Kawamura et al. | |
| 8,874,012 B2 | 10/2014 | Yamada et al. | |
| 8,913,930 B2 | 12/2014 | Ishii et al. | |
| 9,581,931 B2 | 2/2017 | Yamada et al. | |
| 9,599,913 B2 | 3/2017 | Nishioka et al. | |
| 9,625,854 B2 | 4/2017 | Koyanagi et al. | |
| 9,639,009 B2 | 5/2017 | Yamaguchi et al. | |
| 9,665,028 B2 | 5/2017 | Arimura et al. | |
| 9,977,359 B2* | 5/2018 | Koyanagi et al. | .... C08F 226/06 |
| 2013/0122408 A1* | 5/2013 | Haruyama | ............. G03G 15/75 430/56 |
| 2013/0164038 A1 | 6/2013 | Kusaba et al. | |
| 2013/0266339 A1 | 10/2013 | Sugiyama et al. | |
| 2015/0227074 A1 | 8/2015 | Ito et al. | |
| 2015/0331339 A1 | 11/2015 | Yamada et al. | |
| 2015/0331340 A1 | 11/2015 | Nishioka et al. | |
| 2015/0331342 A1 | 11/2015 | Yamaguchi et al. | |
| 2015/0331346 A1 | 11/2015 | Yamauchi et al. | |
| 2015/0331347 A1 | 11/2015 | Arimura et al. | |
| 2016/0187801 A1 | 6/2016 | Yamada et al. | |
| 2016/0187809 A1 | 6/2016 | Yamaguchi et al. | |
| 2016/0363881 A1 | 12/2016 | Urushihara et al. | |
| 2017/0060007 A1 | 3/2017 | Yamada et al. | |

FOREIGN PATENT DOCUMENTS

| | | |
|---|---|---|
| JP | 57005047 A | 1/1982 |
| JP | 60145903 A | 8/1985 |
| JP | 61089230 A | 5/1986 |
| JP | 03192377 A | 8/1991 |
| JP | 2005283995 A | 10/2005 |
| JP | 4165901 B1 | 10/2008 |
| JP | 5627401 B2 | 11/2014 |
| JP | 2014209177 A | 11/2014 |

OTHER PUBLICATIONS

D. Seyferth et al., "Polysilazane Routes to Silicon Nitride", Polym. Prepr. Am. Chem. Soc., Div. Polym. Chem., 25, (1984), 10-12.

* cited by examiner

*Primary Examiner* — Nathan M Nutter
(74) *Attorney, Agent, or Firm* — Venable LLP

(57) ABSTRACT

The present invention provides an electrophotographic member which has a high ability to impart charge to toners while the charge imparting ability is unlikely to be reduced even under an environment at high temperature and high humidity.

The electrophotographic member comprises a substrate, an elastic layer formed on the substrate, an intermediate layer covering the surface of the elastic layer, and a surface layer covering the surface of the intermediate layer, wherein the intermediate layer contains a binder resin and a polymer having a specific structure, the surface layer contains silicon oxide, and the surface layer has a thickness of 10 nm or more and 300 nm or less.

8 Claims, 7 Drawing Sheets

ELECTROPHOTOGRAPHIC MEMBER, PROCESS CARTRIDGE AND ELECTROPHOTOGRAPHIC IMAGE FORMING APPARATUS

BACKGROUND OF THE INVENTION

Field of the Invention

The present invention relates to an electrophotographic member used in electrophotographic image forming apparatuses, and a process cartridge and an electrophotographic image forming apparatus including the electrophotographic member.

Description of the Related Art

Electrophotographic members are used in a variety of applications, such as developer carriers, transfer members, charging members, cleaning blades, and members for regulating the thickness of developer layers. These electrophotographic members typically have a volume resistance value of $10^3$ to $10^9$ $\Omega\cdot$cm. Some of these electrophotographic members play a role to impart charges to toners by triboelectric charging, leading to a requirement for appropriate control of the charging states of the toners from the viewpoint of high image quality and high durability. Particularly, an insufficient charge quantity of the toner causes problems such as image defects (hereinafter, also referred to as "fogging") in the latter half of the durability life of the electrophotographic member, in which toners are unintendedly developed in white portions of images.

Accordingly, an improvement in ability to impart triboelectric charging to toners has recently been required. Japanese Patent Application Laid-Open No. 2005-283995 proposes a developing roller including a surface layer containing a graft compound having an aminoethyl group to enhance the ability to impart charge to toners having negative charging properties. Japanese Patent Application Laid-Open No. H03-192377 proposes a method of adding a copolymer containing a quaternary ammonium salt group to the surface layer of a developing roller to enhance the ability to impart charge to toners having negative charging properties.

Recently, electrophotographic image forming apparatuses should meet a requirement to stably output high quality electrophotographic images even under an environment at high temperature and high humidity, such as a temperature of 32° C. and a relative humidity of 95%. Developing rollers including a surface layer containing a urethane resin having an aminoethyl group or containing a copolymer having a quaternary ammonium salt group can impart high charges to toners in the initial period in use. However, after such developing rollers are used for a long period of time under an environment at high temperature and high humidity, their ability to impart charges to toners may be reduced.

In charging rollers used in electrophotographic image forming apparatuses of the so-called cleanerless type, the charging rollers have an insufficient ability to impart charge to toners. If these charging rollers cannot impart sufficient charges to transfer residual toners, those transfer residual toners readily adhere to the surfaces of the charging rollers. As a result, the surface resistance of the charging rollers may partially increase to cause fine stripe-like irregularities in halftone images (hereinafter, referred to as "horizontal streak images"). These horizontal streak images will increase as the surface of the charging roller has a larger amount of dirt, and will be remarkably found with long-term use of the charging roller.

SUMMARY OF THE INVENTION

The present invention is directed to providing an electrophotographic member which has a high ability to impart charge to toners while the charge imparting ability is unlikely to be reduced even under an environment at high temperature and high humidity. Further, the present invention is directed to providing an electrophotographic image forming apparatus which can stably output electrophotographic images of high quality, and a process cartridge used in the electrophotographic image forming apparatus.

According to one aspect of the present invention, there is provided an electrophotographic member comprising a substrate, an elastic layer on the substrate, an intermediate layer covering the surface of the elastic layer, and a surface layer covering the surface of the intermediate layer, wherein the surface layer contains silicon oxide, the surface layer has a thickness of 10 nm or more and 300 nm or less, and the intermediate layer contains a binder resin, and a polymer having at least one structure selected from the group consisting of a structure represented by structural formula (1) below, a structure represented by structural formula (2) below and a structure represented by structural formula (3) below:

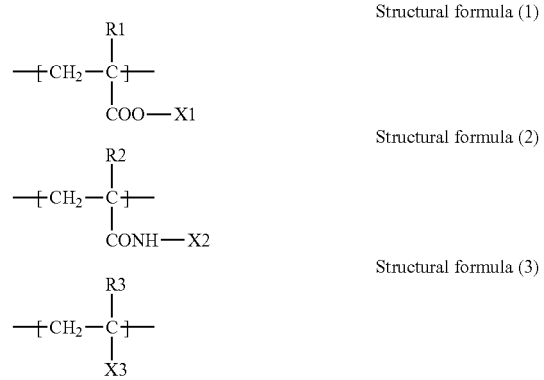

in structural formula (1), R1 is a hydrogen atom or a methyl group; and X1 is a structure selected from the group consisting of structures represented by structural formulas (5) and (6);
in structural formula (2), R2 is a hydrogen atom or a methyl group; and X2 is a structure selected from the group consisting of structures represented by structural formulas (5) and (6);
in structural formula (3), R3 is a hydrogen atom or a methyl group; and X3 is a structure selected from the group consisting of structures represented by structural formulas (7) and (8);

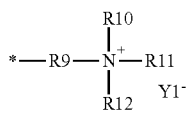
Structural formula (6)

in structural formula (5), R6 is a divalent hydrocarbon group having 1 or more and 4 or less carbon atoms; and R7 and R8 are each independently a methyl group or an ethyl group; and in structural formulas (5) and (6), * is a site of bonding to the structure represented by structural formula (1) or (2); in structural formula (6), R9 is a divalent hydrocarbon group having 1 or more and 4 or less carbon atoms; R10, R11 and R12 are each independently a hydrocarbon group having 1 or more and 18 or less carbon atoms; and Y1⁻ is an anion;

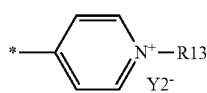
Structural formula (7)

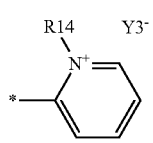
Structural formula (8)

in structural formula (7), R13 is a hydrocarbon group having 1 or more and 13 or less carbon atoms; and Y2⁻ is an anion; in structural formulas (7) and (8), * is a site of bonding to the structure represented by structural formula (3); and in structural formula (8), R14 is a hydrocarbon group having 1 or more and 13 or less carbon atoms; and Y3⁻ is an anion.

According to another aspect of the present invention, there is provided a process cartridge detachably attachable to the main body of an electrophotographic image forming apparatus, and including the electrophotographic member. According to further aspect of the present invention, there is provided an electrophotographic image forming apparatus including the electrophotographic member.

Further features of the present invention will become apparent from the following description of exemplary embodiments with reference to the attached drawings.

DESCRIPTION OF THE EMBODIMENTS

Figure 1:
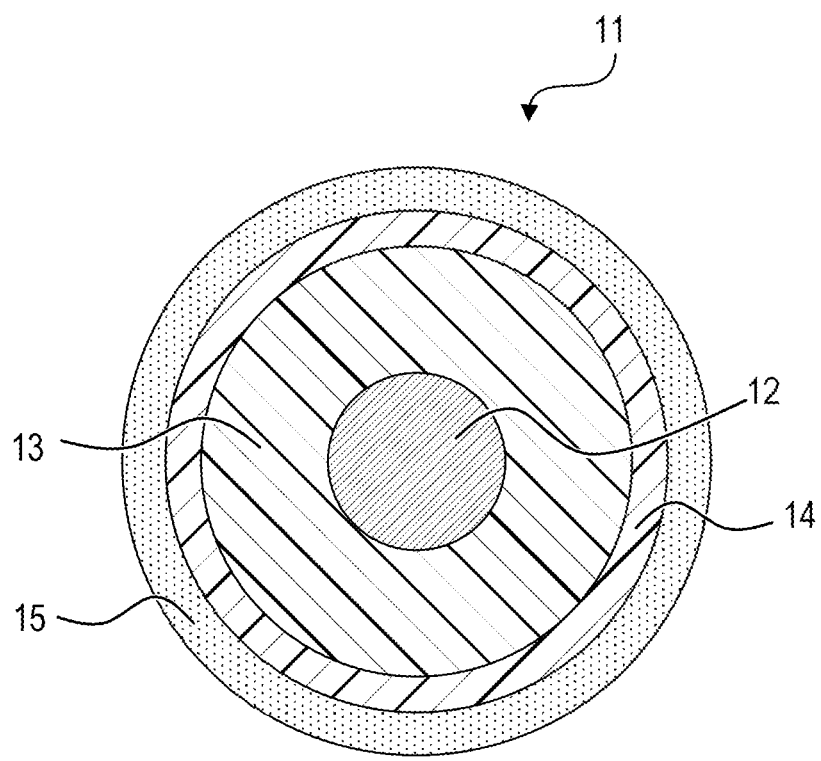
FIG. 1 is a conceptual diagram illustrating an exemplary electrophotographic member of the present invention.

Preferred embodiments of the present invention will now be described in detail in accordance with the accompanying drawings.

According to the examination by the present inventors, in the developing rollers according to Japanese Patent Application Laid-Open Nos. 2005-283995 and H03-192377 used under an environment at a temperature of 32° C. and a relative humidity of 95% for formation of electrophotographic images, the charges applied to a toner by the developing roller gradually reduced, and in some cases, fogging occurred in electrophotographic images output in the latter half of the formation of electrophotographic images when a large amount of sheets was printed.

As a result of further research repeatedly conducted by the present inventors based on such knowledge, the present inventors have found that an electrophotographic member having the following configuration has a high ability to impart charge to toners while the charge imparting ability is unlikely to be reduced even under an environment at high temperature and high humidity.

That is, the electrophotographic member includes a substrate, an elastic layer on the substrate, an intermediate layer covering the surface of the elastic layer, and a surface layer covering the surface of the intermediate layer, wherein the surface layer contains silicon oxide, the surface layer has a thickness of 10 nm or more and 300 nm or less, and the intermediate layer contains a binder resin, and a polymer having at least one structure selected from the group consisting of a structure represented by structural formula (1) below, a structure represented by structural formula (2) below and a structure represented by structural formula (3) below,

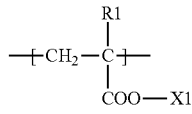
Structural formula (1)

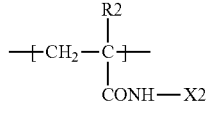
Structural formula (2)

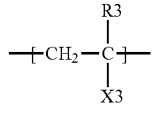
Structural formula (3)

in structural formula (1), R1 is a hydrogen atom or a methyl group; and X1 is a structure selected from the group consisting of structures represented by structural formulas (5) and (6);

in structural formula (2), R2 is a hydrogen atom or a methyl group; and X2 is a structure selected from the group consisting of structures represented by structural formulas (5) and (6);

in structural formula (3), R3 is a hydrogen atom or a methyl group; and X3 is a structure selected from the group consisting of structures represented by structural formulas (7) and (8);

Structural formula (5)

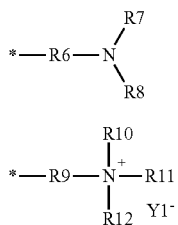

Structural formula (6)

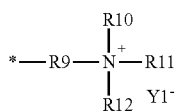

in structural formula (5), R6 is a divalent hydrocarbon group having 1 or more and 4 or less carbon atoms; and R7 and R8 are each independently a methyl group or an ethyl group; in structural formulas (5) and (6), * is a site of bonding to the structure represented by structural formula (1) or (2); and in structural formula (6), R9 is a divalent hydrocarbon group having 1 or more and 4 or less carbon atoms; R10, R11 and R12 are each independently a hydrocarbon group having 1 or more and 18 or less carbon atoms; and $Y1^-$ is an anion:

Structural formula (7)

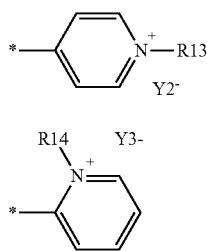

Structural formula (8)

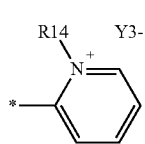

in structural formula (7), R13 is a hydrocarbon group having 1 or more and 13 or less carbon atoms; and $Y2^-$ is an anion; in structural formulas (7) and (8), * is a site of bonding to the structure represented by structural formula (3); and in structural formula (8), R14 is a hydrocarbon group having 1 or more and 13 or less carbon atoms; and $Y3^-$ is an anion.

The electrophotographic member having such a configuration can stably impart charges to toners even under an environment at high temperature and high humidity. The present inventors infer the following reasons.

It is considered that among the structures represented by structural formulas (1), (2) and (3) and included in the polymer contained in the intermediate layer, at least one structure imparts a function to enhance the charge quantity of the toner to the polymer.

The structures represented by structural formulas (1) and (2) each include a structure in which an alkyl group, which is an electron donating group, bonds to a nitrogen atom in the molecule, and thus have increased electron density of the nitrogen atom in the molecule. Considering these structures as functional groups containing nitrogen, an amino group and an ammonium group are known as electron donating groups, and do not have a strong force to bond electrons of nitrogen, which are donated by the alkyl group. For this reason, it is inferred that the nitrogen atoms contained in the amino group and the ammonium group can appropriately release electrons donated by the alkyl group, and thus the charge imparting ability can be demonstrated even under an environment at high temperature and high humidity in which the charge imparting ability readily reduces.

The structure represented by structural formula (3) includes a structure having a pyridinium group containing a nitrogen atom in the molecule. The electrons of the nitrogen atom in the pyridinium group occupy the $SP^2$ hybrid orbital, and an unshared electron pair is present externally projected from the ring. This unshared electron pair is not subjected to π-electron resonance stabilization, but is only bound by the atom nucleus of the nitrogen atom. Thus, the force to bind the unshared electron pair is weaker than those in formation of a σ-bond and formation of a π-electron resonance structure. Additionally, the unshared electron pair is externally projected from the ring to increase the probability that the unshared electron pair contacts with other molecules. It is inferred that these synergetic effects can provide a charge imparting ability even under an environment at high temperature and high humidity.

However, it is known that for example, if an external additive of toners and others adhere to the intermediate layer having at least one structure selected from the group consisting of the structures represented by structural formulas (1), (2) and (3) after printing is performed on a large amount of sheets under an environment at high temperature and high humidity, the charge imparting ability of the electrophotographic member is reduced according to the thickness of the adherent.

From this fact, it was considered that to demonstrate the charge imparting effect by the compounds having the structures represented by structural formulas (1), (2) and (3), the charging target (toner) should be brought into contact with a compound having at least one structure selected from the group consisting of the structures represented by structural formulas (1), (2) and (3). However, according to the examination by the present inventors, it was found that the charge imparting effect of the electrophotographic member based on the structures represented by structural formulas (1), (2) and (3) is demonstrated if the distance between the charging target and the intermediate layer having at least one structure selected from the group consisting of the structures represented by structural formulas (1), (2) and (3) is less than 300 nm.

Then, a thin film of a highly hard acrylic resin having an effect of preventing adhesion is formed on the intermediate layer having at least one structure selected from the group consisting of the structures represented by structural formulas (1), (2) and (3). Such a thin film of a highly hard acrylic resin causes a reduction in charge quantity of the toner after printing is performed on a large amount of sheets under an environment at high temperature and high humidity.

Since the intermediate layer having at least one structure selected from the group consisting of the structures represented by structural formulas (1), (2) and (3) is sufficiently close to the toner, the charge imparting effect based on the structures represented by structural formulas (1), (2) and (3) should have been demonstrated, and the charge quantity should have been ensured. The present inventors infer that this reduction in the charge quantity of the toner occurs irrespective of such a sufficient distance between the intermediate layer and the charging target because the amount of leakage of charges of the toner was larger than the charge quantity imparted based on the structures represented by structural formulas (1), (2) and (3).

Under an environment at high temperature and high humidity, the air contains a large amount of moisture, the moisture permeates into the acrylic resin, which is an organic polymer molecule to increase the moisture content in the resin. The present inventors infer that the increased moisture content reduced the volume resistivity of the acrylic resin in the surface layer to increase the amount of leakage of charges of the toner, thus overwhelming the charge imparting effect based on the structures represented by structural formulas (1), (2) and (3) and thus reducing the charge quantity of the toner.

According to one aspect of the present invention, the surface layer in the electrophotographic member contains silicon oxide as a binder. The silicon oxide prevents adhesion of the toner and the external additive because silicon oxide is so hard as to prevent the toner from embedding into the surface layer and thus an increase in contact area with the toner. Furthermore, the silicon oxide is an inorganic film having a dense crosslinked structure. The moisture is difficult to permeate into such a film. For this reason, the moisture barely permeates into the surface layer even if a large amount of moisture is contained in the air. Thus, the volume resistivity of the surface layer is unlikely to reduce. Accordingly, it is inferred that the silicon oxide contained in the surface layer can prevent adhesion of the toner and the external additive while reducing a fluctuation in volume resistivity of the surface layer, and thus can prevent a reduction in charge quantity of the toner even if printing is performed on a large amount of sheets under an environment at high temperature and high humidity.

The present inventors have found that the synergetic effect of the intermediate layer and the surface layer can be attained through control of the surface layer into a specific thickness, and have achieved the present invention.

<Electrophotographic Member>

The electrophotographic member refers to a member such as a developer carrier, a transfer member, a charging member, a cleaning blade, and a member for regulating the thickness of a developer layer. Specific examples thereof include developing rollers, transfer rollers, conductive rollers such as charging rollers, cleaning blades, and developing blades. The electrophotographic member according to the present invention will now be described using a conductive roller as a typical example, but the present invention will not be limited to this.

As illustrated in FIG. 1, for example, a conductive roller 11 includes a conductive substrate 12, an elastic layer 13 on the outer periphery of the substrate, an intermediate layer 14, and a surface layer 15 disposed in this order. The elastic layer 13 may be a single layer, or may be a plurality of layers.

The electrophotographic member can be used in any of non-contacting developing apparatuses using magnetic one-component developers or non-magnetic one-component developers, contact developing apparatuses, and developing apparatuses using two-component developers.

<Substrate>

The substrate functions as a solid or hollow electrode and supporting member for the conductive roller. The substrate includes a conductive material such as a metal such as aluminum or copper or an alloy such as stainless steel; iron plated with chromium or nickel; or a synthetic resin having conductivity.

<Elastic Layer>

The elastic layer gives the conductive roller an elasticity needed for formation of a nip having a predetermined width in the contact region between the conductive roller and an electrophotographic photosensitive member (hereinafter, referred to as photoreceptor). The elastic layer may be present in the form of a single layer or a plurality of layers. The elastic layer can be formed of a molded article of a typical rubber material. Examples of the typical rubber material include: ethylene-propylene-diene copolymerized rubber (EPDM), acrylonitrile-butadiene rubber (NBR), chloroprene rubber (CR), natural rubber (NR), isoprene rubber (IR), styrene-butadiene rubber (SBR), fluorine rubber, silicone rubber, epichlorohydrin rubber, hydrides of NBR, and urethane rubber.

These rubber materials may be used singly or in combinations or two or more. Among these rubber materials, particularly silicone rubber can be used from the viewpoint of the compression set and the flexibility. Examples of the silicone rubber include polydimethylsiloxane, polytrifluoropropylsiloxane, polymethylvinylsiloxane, polyphenylvinylsiloxane, and copolymers of these polysiloxanes.

A variety of additives such as a conductive agent, a non-conductive filler, a crosslinking agent and a catalyst can be appropriately compounded in the elastic layer in the ranges achieving the purposes of compounding these additives and not impairing the advantageous effects of the present invention.

Examples of usable conductive agents include carbon black; conductive metals such as aluminum and copper; a fine particle of conductive metal oxides such as zinc oxide, tin oxide and titanium oxide; and ionically conductive agents such as quaternary ammonium salts. Among these conductive agents, particularly carbon black can be used because of its relatively high availability, ability to impart conductivity, and reinforcing properties.

Examples of the non-conductive filler include silica, quartz powder, titanium oxide, zinc oxide or calcium carbonate.

Any crosslinking agent can be used. Examples thereof include tetraethoxysilane, di-t-butyl peroxide, 2,5-dimethyl-2,5-di(t-butylperoxy)hexane or dicumyl peroxide.

<Intermediate Layer>

The intermediate layer contains a binder resin and a polymer having at least one structure selected from the group consisting of a structure represented by structural formula (1) below, a structure represented by structural formula (2) below and a structure represented by structural formula (3) below.

The polymer contributes to the ability to impart triboelectric charging to the toner. The polymer is prepared through polymerization of an acrylic monomer having a specific functional group, an acrylamide monomer, or another vinyl polymerizable monomer by a known method.

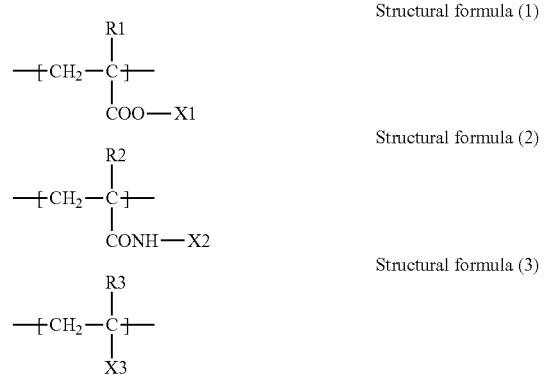

in structural formula (1), $R_1$ is a hydrogen atom or a methyl group; and $X_1$ is a structure selected from the group consisting of structures represented by structural formulas (5) and (6); in structural formula (2), $R_2$ is a hydrogen atom or a methyl group; and $X_2$ is a structure selected from the group consisting of structures represented by structural formulas (5) and (6); in structural formula (3), $R_3$ is a hydrogen atom or a methyl group; and X3 is a structure selected from the group consisting of structures represented by structural formulas (7) and (8);

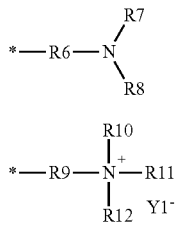

Structural formula (5)

Structural formula (6)

in structural formula (5), R6 is a divalent hydrocarbon group having 1 or more and 4 or less carbon atoms; and R7 and R8 are each independently a methyl group or an ethyl group; in structural formulas (5) and (6), * is a site of bonding to the structure represented by structural formula (1) or (2);
in structural formula (6), R9 is a divalent hydrocarbon group having 1 or more and 4 or less carbon atoms; R10, R11 and R12 are each independently a hydrocarbon group having 1 or more and 18 or less carbon atoms; and Y1⁻ is an anion;

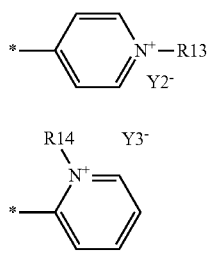

Structural formula (7)

Structural formula (8)

in structural formula (7), R13 is a hydrocarbon group having 1 or more and 13 or less carbon atoms; and Y2⁻ is an anion; in structural formulas (7) and (8), * is a site of bonding to the structure represented by structural formula (3); and in structural formula (8), R14 is a hydrocarbon group having 1 or more and 13 or less carbon atoms; and Y3⁻ is an anion.

The structure represented by structural formula (1) represents a structure of a polymerized acrylic acid ester monomer or methacrylic acid ester monomer. The structure represented by structural formula (2) represents a structure of a polymerized acrylamide monomer or methacrylamide monomer. X1 in structural formula (1) and X2 in structural formula (2) represent a structure represented by structural formula (5) or structural formula (6).

Structural formula (5) represents a functional group having a tertiary amino group. In structural formula (5), since R6 is a divalent hydrocarbon group having 1 or more and 4 or less carbon atoms, the resulting polymer is unlikely to have an excessively soft structure, and thus causes no tackiness of the surface of the electrophotographic member. In structural formula (5), since R7 and R8 are a methyl group or an ethyl group, the resulting polymer is unlikely to have an excessively soft structure, and thus causes no tackiness of the surface of the electrophotographic member.

Specific examples of monomers having a structure represented by structural formula (1) and X1 having a structure represented by structural formula (5) include: N,N-dimethylaminomethyl (meth)acrylate, N,N-diethylaminomethyl (meth)acrylate, N,N-dimethylaminoethyl (meth)acrylate, N,N-diethylaminoethyl (meth)acrylate, N,N-dimethylaminopropyl (meth)acrylate, N,N-diethylaminopropyl (meth)acrylate, N,N-dimethylaminobutyl (meth)acrylate and N,N-diethylaminobutyl (meth)acrylate. The term "(meth)acrylate" used herein refers to methacrylate and/or acrylate.

Structural formula (6) represents a functional group having a quaternary ammonium salt group. In structural formula (6), since R9 is a divalent hydrocarbon group having 1 or more and 4 or less carbon atoms, the resulting polymer is unlikely to have an excessively soft structure, and thus causes no tackiness of the surface of the electrophotographic member. In structural formula (6), if R10, R11 and R12 have 1 or more and 13 or less carbon atoms, the resulting polymer is unlikely to have an excessively soft structure, and thus causes no tackiness of the surface of the electrophotographic member. Additionally, a reduction in compatibility with the binder resin, which is caused by an increase in polarity of the polymer, can be prevented. The anion for Y1⁻ can be halogen ions such as chlorine and bromine; and aromatic sulfonic acid ions such as para-toluene sulfonic acid ions and naphthylsulfonic acid ions.

Specific examples of the monomer having a structure represented by structural formula (1) and X1 having a structure represented by structural formula (6) include: bromides, chlorides, para-toluene sulfonates and naphthylsulfonates of trimethylaminoethyl (meth)acrylate cation, trimethylaminomethyl (meth)acrylate cation, dimethyl-n-butylaminoethyl (meth)acrylate cation, triethylaminoethyl (meth)acrylate cation, dimethyl-n-octylaminoethyl (meth)acrylate cation, diethyl-n-octylaminoethyl (meth)acrylate cation, dimethyllaurylaminoethyl (meth)acrylate cation, dimethyltridecylaminoethyl (meth)acrylate cation and tributylaminoethyl (meth)acrylate cation.

The structure represented by structural formula (3) represents a structure of a polymerized vinylpyridinium monomer. X3 in structural formula (3) represents a structure represented by structural formula (7) or structural formula (8).

Structural formula (7) represents a functional group bonded to the structure represented by structural formula (3) at the 4-position of the pyridinium structure. In structural formula (7), if R13 has 1 or more and 13 or less carbon atoms, the resulting polymer barely has an excessively soft structure, and thus causes no tackiness of the surface of the electrophotographic member. Additionally, a reduction in compatibility with the binder resin, which is caused by an increase in polarity of the polymer, can be prevented. In structural formula (7), the anion for Y2⁻ can be halogen ions such as chlorine and bromine; and aromatic sulfonic acid ions such as para-toluene sulfonic acid ions and naphthylsulfonic acid ions.

Specific examples of the monomer having a structure represented by structural formula (3) and X3 having a structure represented by structural formula (7) include: bromides, chlorides, para-toluene sulfonates and naphthylsulfonates of 1-methyl-4-vinylpyridinium cation, 1-ethyl-4-vinylpyridinium cation, 1-n-butyl-4-vinylpyridinium cation, 1-n-octyl-4-vinylpyridinium cation, 1-lauryl-4-vinylpyridinium cation, 1-tridecyl-4-vinylpyridinium cation, 1-methyl-4-isopropenylpyridinium cation, 1-ethyl-4-isopropenylpyridinium cation, 1-n-butyl-4-isopropenylpyridinium cation, 1-n-octyl-4-isopropenylpyridinium cation, 1-lauryl-4-isopropenylpyridinium cation and 1-tridecyl-4-isopropenylpyridinium cation.

Structural formula (8) represents a functional group bonded to the structure represented by structural formula (3) at the 2-position of the pyridinium structure. In structural formula (8), if R14 has 1 or more and 13 or less carbon atoms, the resulting polymer is unlikely to have an excessively soft structure, and thus causes no tackiness of the surface of the electrophotographic member. Additionally, a reduction in compatibility with the binder resin, which is caused by an increase in polarity of the polymer, can be prevented. In structural formula (8), the anion for Y3⁻ can be halogen ions such as chlorine and bromine; and aromatic sulfonic acid ions such as para-toluene sulfonic acid ions and naphthylsulfonic acid ions.

Specific examples of the monomer having a structure represented by structural formula (3) and X3 having a structure represented by structural formula (8) include: bromides, chlorides, para-toluene sulfonates and naphthylsulfonates of 1-methyl-2-vinylpyridinium cation, 1-ethyl-2-vinylpyridinium cation, 1-n-butyl-2-vinylpyridinium cation, 1-n-octyl-2-vinylpyridinium cation, 1-lauryl-2-vinylpyridinium cation, 1-tridecyl-2-vinylpyridinium cation, 1-methyl-2-isopropenylpyridinium cation, 1-ethyl-2-isopropenylpyridinium cation, 1-n-butyl-2-isopropenylpyridinium cation, 1-n-octyl-2-isopropenylpyridinium cation, 1-lauryl-2-isopropenylpyridinium cation and 1-tridecyl-2-isopropenylpyridinium cation.

The functional groups represented by structural formulas (5), (6), (7) and (8) and containing nitrogen function as segments for imparting charge to toners. The polymer having a structure represented by structural formula (5) is more preferred because this polymer has relatively lower polarity than those of the polymers having onium salt structures represented by structural formulas (6), (7) and (8), and is localized near the surface of the intermediate layer during formation of the intermediate layer to produce an intermediate layer having high charge imparting ability.

The polymer can be a copolymer further having a structure represented by structural formula (4) below to adjust its polarity and compatibility with the binder resin. If the polymer contained in the intermediate layer has a structure represented by structural formula (4), a hydrophobic segment introduced into the chemical structure of the polymer can localize the polymer near the surface of the intermediate layer to provide a higher charge imparting ability.

Structural formula (4)

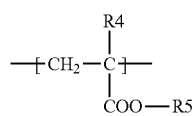

in structural formula (4), R4 is a hydrogen atom or a methyl group; and R5 is a hydrocarbon group having 1 or more and 18 or less carbon atoms. R5 can have 1 or more and 18 or less carbon atoms because if so, a reduction in compatibility with the binder resin can be prevented without remarkably reducing the polarity of the polymer.

Specific examples of the monomer having a structure represented by structural formula (4) include: methyl (meth)acrylate, ethyl (meth)acrylate, n-butyl (meth)acrylate, tert-butyl (meth)acrylate, iso-butyl (meth)acrylate, n-amyl (meth)acrylate, n-hexyl (meth)acrylate, cyclohexyl (meth)acrylate, benzyl (meth)acrylate, phenyl (meth)acrylate, 2-ethylhexyl (meth)acrylate, n-octyl (meth)acrylate, iso-octyl (meth)acrylate, isobornyl(meth)acrylate, lauryl (meth)acrylate and stearyl (meth)acrylate.

The polymer can have a number average molecular weight of 10000 or more and 70000 or less from the viewpoint of the compatibility with the binder resin and the flexibility. The content of the polymer in the intermediate layer can be 1 part by mass or more and 20 parts by mass or less relative to 100 parts by mass of the binder resin in the intermediate layer.

[Binder Resin]

The binder resin functions as a carrier of the polymer. Any known resin can be used as the binder resin. Examples thereof include:

polyurethane resins, polyester resins, polyether resins, acrylic resins, epoxy resins, amino resins such as melamine resins, amide resins, imide resins, amide imide resins, phenol resins, vinyl resins, silicone resins, fluorine resins and polyalkyleneimine resins.

These resins may be used singly or in combinations of two or more. Among these resins, polyurethane resins and melamine resins are suitably used from the viewpoint of the strength of the intermediate layer and the charging properties of the toners. Furthermore, thermosetting polyether polyurethane resins and polyester polyurethane resins are particularly suitably used because of their flexibility.

[Polyurethane Resins]

Examples of these polyurethane resins include thermosetting polyurethane resins prepared through a reaction of a known polyether polyol or polyester polyol with an isocyanate compound.

Examples of the polyether polyol include polyethylene glycol, polypropylene glycol and polytetramethylene glycol. Examples of the polyester polyol include: polyester polyols prepared through a condensation reaction of a diol component such as 1,4-butanediol, 3-methyl-1,4-pentanediol or neopentylglycol or a triol component such as trimethylolpropane with a dicarboxylic acid such as adipic acid, phthalic anhydride, terephthalic acid or hexahydroxyphthalic acid. Examples of the polycarbonate polyol include: polycarbonate polyols prepared through a condensation reaction of a diol component such as 1,3-propanediol, 1,4-butanediol, 1,6-hexanediol, 3-methyl-1,5-pentanediol, diethylene glycol, polyethylene glycol, polypropylene glycol or polytetramethylene glycol with a dialkyl carbonate such as phosgene or dimethyl carbonate or a cyclic carbonate such as ethylene carbonate.

These polyol components may be preliminarily prepared, when necessary, as prepolymers chain-extended with an isocyanate such as 2,4-tolylene diisocyanate (TDI), 1,4-diphenylmethane diisocyanate (MDI) or isophorone diisocyanate (IPDI).

Any isocyanate compound can be reacted with these polyol components. Examples thereof include: aliphatic isocyanates such as ethylene diisocyanate and 1,6-hexamethylene diisocyanate (HDI); alicyclic isocyanates such as isophorone diisocyanate (IPDI), cyclohexane 1,3-diisocyanate and cyclohexane 1,4-diisocyanate; aromatic isocyanates such as 2,4-tolylene diisocyanate, 2,6-tolylene diisocyanate (TDI), 4,4'-diphenylmethane diisocyanate (MDI), polymeric diphenylmethane diisocyanate, xylylene diisocyanate and naphthalene diisocyanate; and copolymerized products thereof, isocyanurate products thereof, TMP adduct products thereof, biuret products thereof and block products thereof.

Among these isocyanate compounds, aromatic isocyanates such as tolylene diisocyanate, diphenylmethane diisocyanate and polymeric diphenylmethane diisocyanate are more suitably used. For the mixing ratio of the isocyanate compound to be reacted with the polyol component, the ratio of an isocyanate group to a hydroxyl group (1.0) can be within the range of 1.0 to 4.5, because residues of non-reacted components can be reduced.

Besides the thermal curing reaction using an isocyanate compound, the polyol may be replaced with a compound having a vinyl group or an acryloyl group introduced at the terminal, and the compound may be cured with ultraviolet light or electron beams. The curing reaction in a curing system using ultraviolet light or electron beams can be performed in a shorter time than that in a curing system using an isocyanate.

<Surface Layer>

The surface layer contains silicon oxide.

[Silicon Oxide]

The silicon oxide is usually a compound represented as $SiO_x$ ($0<x\leq2$). The surface layer containing silicon oxide can be formed by any method. Examples of such a method include: wet coating methods such as dip coating, spray coating, roll coating and ring coating; physical vapor deposition (PVD) methods such as vacuum deposition, sputtering and ion plating; and chemical vapor deposition (CVD) methods such as plasma CVD, thermal CVD and laser CVD.

[Wet Coating Method]

Examples of the wet coating method include a method using a sol-gel method and a method using polysilazane. Among these methods, particularly a method using polysilazane to form a surface layer including a polysilazane film can be used because the adhesion to the intermediate layer containing a polyurethane resin is enhanced and the resulting electrophotographic member has an enhanced charge imparting ability.

[Polysilazane]

Polysilazane has a structural unit represented by formula (11) below. The production methods are reported in Japanese Patent Application Laid-Open Nos. S60-145903 and S61-89230, and Polym. Prepr. Am. Chem. Soc., Div. Polym. Chem., 25, 10 (1984).

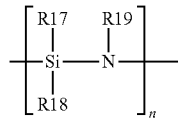

Formula (11)

in formula (11), R17 and R18 are each independently a hydrogen atom, a hydrocarbon group having 1 or more carbon atoms and having an optional substituent, or a hydrocarbon oxy group having 1 or more carbon atoms and having an optional substituent. R19 is a hydrogen atom, or a hydrocarbon group having 1 or more carbon atoms and having an optional substituent.

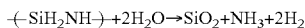

Formula (12)

The polysilazane reacts with water as illustrated in the reaction formula (12) when R17, R18 and R19 are hydrogen atoms. Most of the polysilazane is converted into a Si—O skeleton. Part of the polysilazane skeleton remains in the polysilazane film without being converted into the Si—O skeleton. It is inferred that nitrogen atoms in the residual polysilazane skeleton enhance the charge imparting ability of the polysilazane film. The Si—N bonds in the residual polysilazane skeleton can be verified by standard infrared absorption spectrum analysis. R17 and R18 can be each independently a hydrogen atom, a methyl group, an ethoxy group or an aminopropyl group because if so, the polysilazane has a dense structure.

The polysilazane can have a structure represented by structural formula (9) below. If R19 in formula (11) is a hydrogen atom, the conversion of the Si—N bond into the Si—O bond is facilitated.

Structural formula (9)

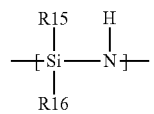

in structural formula (9), R15 and R16 are each independently a group selected from the group consisting of a hydrogen atom, a methyl group, an ethoxy group and an aminopropyl group.

If the polysilazane is dissolved in a solvent to prepare a solution, examples of the solvent include: saturated hydrocarbon compounds (pentane, hexane, heptane, octane, nonane and cyclohexane), aromatic compounds (benzene, toluene and xylene), ethers (dimethyl ether and diethyl ether) and ketones (methyl ethyl ketone and methyl isobutyl ketone).

A catalyst can be used to promote the conversion of the polysilazane into silicon oxide. Examples of catalysts that can be used include heterocyclic compounds, amines, organic acids, inorganic acids and metal carboxylates. The amount of the catalyst to be added is preferably 0.01 to 10% by mass, more preferably 0.1 to 1.0% by mass relative to 100% by mass of the polysilazane.

[Sol-Gel Method]

The film of silicon oxide can be produced by a sol-gel method through hydrolysis of an organic silicon compound. Specifically, examples of the organic silicon compound include: tetramethoxysilane, tetraethoxysilane, tetrapropoxysilane, methyltrimethoxysilane, methyltriethoxysilane, methyltripropoxysilane, ethyltrimethoxysilane, ethyltripropoxysilane, propyltrimethoxysilane, propyltriethoxysilane, propyltripropoxysilane, hexyltrimethoxysilane, hexyltriethoxysilane, phenyltripropoxysilane, decyltrimethoxysilane, decyltriethoxysilane and decyltripropoxysilane; dimethyldimethoxysilane, dimethyldiethoxysilane, dimethyldipropoxysilane, dimethyldibutoxysilane, diethyldimethoxysilane, diethyldiethoxysilane, diethyldipropoxysilane, diethyldibutoxysilane, dipropyldimethoxysilane, dipropyldiethoxysilane, dipropyldipropoxysilane, dipropyldibutoxysilane; diphenyldimethoxysilane, diphenyldiethoxysilane, diphenyldipropoxysilane and diphenyldibutoxysilane; and dimethyl siloxane of terminal silanol.

These organic silicon compounds can be used singly or in combinations of two or more. In the presence of water, these organic silicon compounds can be subjected to a hydrolysis reaction to prepare a hydrolyzable condensate. A hydrolyzable condensate having a desired degree of condensation can be prepared through control of the temperature and the pH during the hydrolysis reaction. A catalyst for the hydrolysis reaction, such as metal alkoxide, may be used during the hydrolysis reaction to control the degree of condensation. Examples of the metal alkoxide include aluminum alkoxide, titanium alkoxide, zirconia alkoxide and complexes thereof (such as acetylacetone complexes thereof).

[CVD Method]

To form a surface layer of silicon oxide by the CVD method, usually a gaseous or gasified organic silicon compound as a raw material gas and when necessary, a hydrocarbon compound are used. Specifically, examples of the organic silicon compound include: 1,1,3,3-tetramethyldisiloxane, hexamethyldisiloxane, hexamethyldisilazane, vinyltrimethylsilane, methyltrimethoxysilane, hexamethyldisilane, methylsilane, dimethylsilane, trimethylsilane, tetramethylsilane, diethylsilane, propylsilane, phenylsilane, vinyltriethoxysilane, vinyltrimethoxysilane, tetramethoxysilane, tetraethoxysilane, phenyltrimethoxysilane, methyltriethoxysilane and octamethylcyclotetrasiloxane.

Among these organic silicon compounds, 1,1,3,3-tetramethyldisiloxane, hexamethyldisiloxane and tetramethylsilane can be used because of their easiness in handling.

Any silane source can be used as the organic silicon compound. Silane, aminosilane and silazane can also be used. A gaseous raw material substance such as an organic silicon compound is used as it is. A liquid raw material substance at normal temperature is vaporized by heating, and is transferred by an inert gas for use. A solid raw material substance at normal temperature is vaporized by heating, and is transferred by an inert gas for use. The vaporization of the raw material substance may be promoted under reduced pressure. With the raw material gas or in addition to the raw material gas, a nitrogen-containing gas or an oxygen-containing gas can also be introduced into a vacuum chamber. Examples of the inert gas include gases such as helium and argon.

[Thickness of Surface Layer]

The surface layer has a thickness of 10 nm or more and 300 nm or less. Since the thickness of the surface layer is 10 nm or more, the surface layer may not peel off after printing is performed on a large amount of sheets. Since the thickness of the surface layer is 300 nm or less, the effect of imparting charge to toners by the polymer according to the present invention contained in the intermediate layer and having a specific structure may not be inhibited. A thickness of the surface layer of less than 10 nm may reduce the adhesion between the surface layer and the intermediate layer, and thus, the surface layer may peel off from the intermediate layer during formation of electrophotographic images.

The thickness of the surface layer can be measured with a thin film measurement apparatus (trade name: F20-EXR; manufactured by FILMETRICS, Inc.). The positions for measurement are nine positions in total, i.e., three places of the central portion of the surface layer in the axial direction and positions 30 mm from both ends of the surface layer toward the central portion in the longitudinal direction are each measured at three positions in the circumferential direction at an interval of 120°. The average of the nine measured values is defined as the thickness. The silicon oxide film having a refractive index set at 1.42 is measured.

Furthermore, the same additives as those for the intermediate layer such as a conductive agent, a non-conductive filler, a crosslinking agent and a catalyst may be compounded in the surface layer in the ranges achieving the purposes of compounding these additives and not impairing the advantageous effects of the present invention.

<Process Cartridge and Electrophotographic Image Forming Apparatus>

The process cartridge is a process cartridge detachably attachable to the main body of an electrophotographic image forming apparatus, and including the electrophotographic member according to the present invention. The electrophotographic image forming apparatus according to the present invention includes the electrophotographic member according to the present invention. The process cartridge and electrophotographic image forming apparatus in which the electrophotographic member according to the present invention can be used will now be described.

Figure 2:
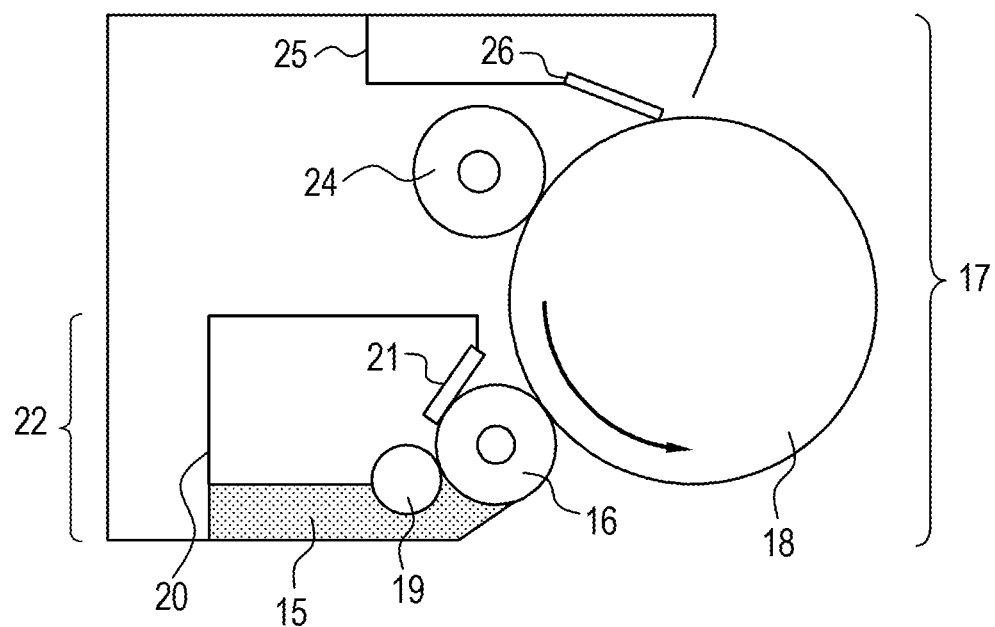
FIG. 2 is a schematic configurational diagram illustrating an exemplary process cartridge of the present invention.

FIG. 2 is a cross-sectional view illustrating an exemplary process cartridge. The process cartridge 17 includes a developing apparatus 22, a photoreceptor 18, a cleaning blade 26, a toner waste container 25 and a charging roller 24. These components are integrally formed into a single process cartridge detachably attachable to the main body of the electrophotographic image forming apparatus. The developing apparatus 22 includes a toner container 20. A toner 15 in the toner container 20 is fed onto the surface of a developing roller 16 by a toner feed roller 19. A layer of the toner 15 having a predetermined thickness is formed on the surface of the developing roller 16 by a developing blade 21.

Figure 3:
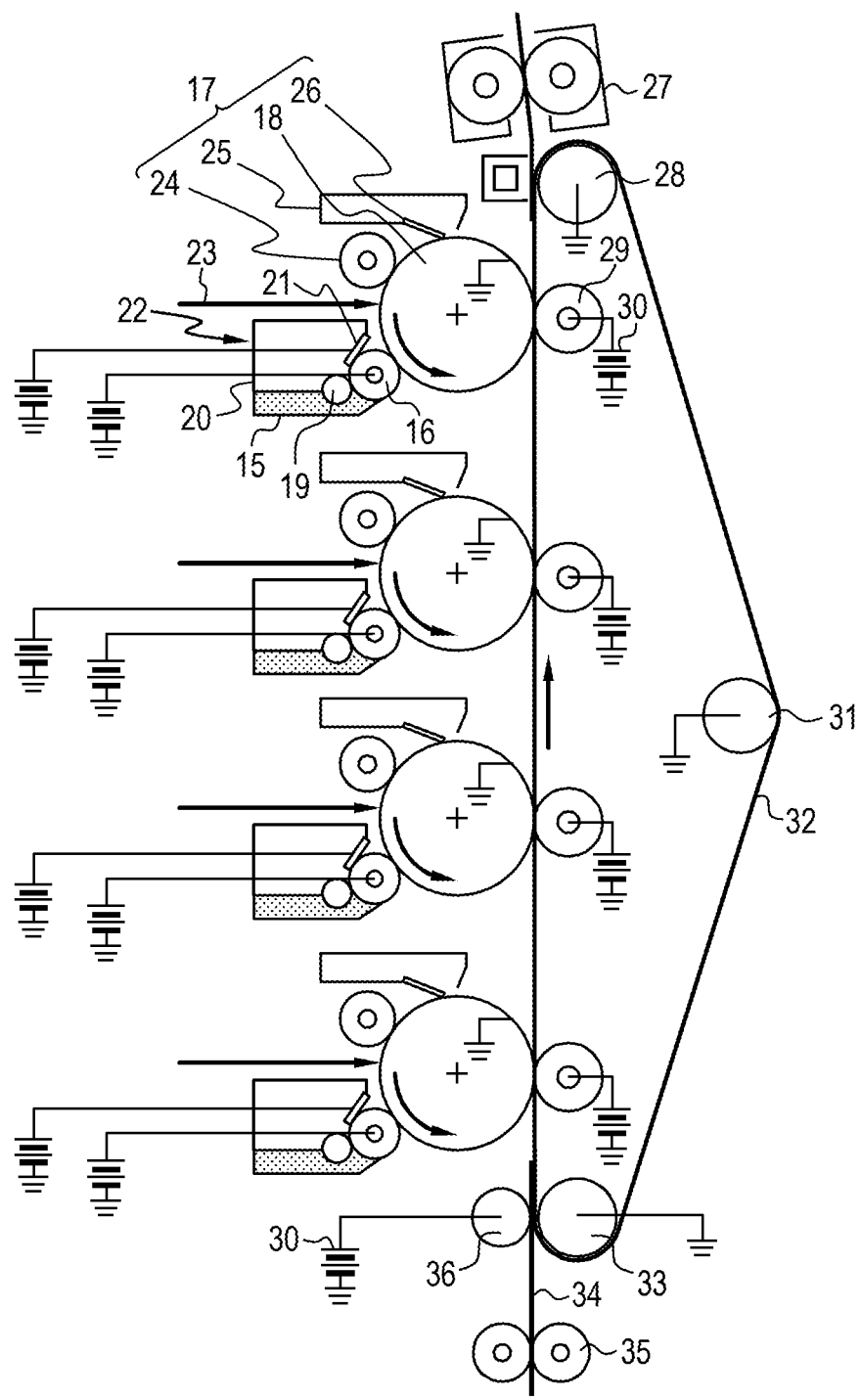
FIG. 3 is a schematic configurational diagram illustrating an exemplary electrophotographic image forming apparatus of the present invention.

FIG. 3 is a cross-sectional view illustrating an exemplary electrophotographic image forming apparatus. The developing apparatus 22 including the developing roller 16, the toner feed roller 19, the toner container 20 and the developing blade 21 is detachably attached to the electrophotographic image forming apparatus. The process cartridge 17 including the photoreceptor 18, the cleaning blade 26, the toner waste container 25 and the charging roller 24 is detachably attached to the electrophotographic image forming apparatus. The photoreceptor 18, the cleaning blade 26, the toner waste container 25 and the charging roller 24 may be disposed in the main body of the electrophotographic image forming apparatus. The photoreceptor 18 rotates in the direction of the arrow, and is uniformly charged by the charging roller 24 for charging the photoreceptor 18 to form an electrostatic latent image on the surface of the photoreceptor by a laser light 23 (an exposing unit) for writing the electrostatic latent image on the photoreceptor 18. The electrostatic latent image is developed with the toner 15 applied by the developing apparatus 22 disposed in contact with the photoreceptor 18 to be visualized as a toner image.

The electrophotographic image forming apparatus performs the so-called reverse developing to form a toner image in the exposing unit. The visualized toner image on the photoreceptor 18 is transferred onto a sheet 34 (recording medium) by a transfer roller 29 as a transfer member. The sheet 34 is fed through a sheet feeding roller 35 and an adsorption roller 36 into the apparatus, and is conveyed between the photoreceptor 18 and the transfer roller 29 by an endless transfer conveying belt 32. The transfer conveying belt 32 is driven by a following roller 33, a driving roller 28 and a tension roller 31. A voltage is applied to the transfer roller 29 and the adsorption roller 36 by a bias power supply 30. The sheet 34 having a toner image transferred thereonto is fixed by a fixing apparatus 27, and is discharged to the outside of the apparatus. The print operation is terminated.

The transfer residual toner left on the photoreceptor 18 without being transferred is scraped off by the cleaning blade 26, which is a cleaning member for cleaning the surface of the photoreceptor, to be accommodated in the toner waste container 25. The cleaned photoreceptor 18 repeatedly performs the above operation.

The developing apparatus 22 includes the toner container 20 accommodating the toner 15 as a one-component developer, and the developing roller 16 as a developer carrier located in the toner container 20 at the opening extending in the longitudinal direction and disposed facing the photoreceptor 18. The developing apparatus 22 develops and visualizes the electrostatic latent image on the photoreceptor 18.

The electrophotographic member according to the present invention can be used as at least one of the developing roller and the developing blade for the process cartridge and the electrophotographic image forming apparatus. Since particularly the developing roller for the process cartridge and the electrophotographic image forming apparatus should have uniform and stable conductivity even if the environment for use varies, the electrophotographic member of the present invention can be used as the developing roller.

One aspect of the present invention can provide an electrophotographic member which has a high ability to impart charge to toners while the charge imparting ability is unlikely to reduced even after its long-term use under an environment at high temperature and high humidity. Another aspect of the present invention can provide a process cartridge and an electrophotographic image forming apparatus which can stably form electrophotographic images of high quality.

EXAMPLES

The present invention will now be described more specifically by way of Production Examples, Examples and Comparative Examples. Production Examples A1 to A6 are Synthetic Examples of monomers A-1 to A-6 which serve as raw materials for the polymer contained in the intermediate layer. Production Examples B1 to B18 are Synthetic Examples of polymers B-1 to B-18 contained in the intermediate layer. Production Examples C1 and C2 are Synthetic Examples of isocyanate group-terminated prepolymers C-1 and C-2 used as raw materials for the binder resin contained in the intermediate layer. Production Examples D1 to D5 are Preparation Examples of coating materials D-1 to D-5 for forming a surface layer.

Examples 1 to 23 and Comparative Examples 1 to 5 are examples for preparation and evaluation of conductive rollers and evaluation of developing rollers. Examples 24 to 29 and Comparative Examples 6 to 9 are examples for preparation and evaluation of developing blades. Examples 30 to 35 and Comparative Examples 10 to 13 are examples for preparation of conductive rollers and evaluation of charging rollers.

[Production Example A1] Synthesis of Monomer A-1

500 g of dry tetrahydrofuran and 130.5 g of dimethylaminoethyl methacrylate (trade name: Light Ester DM; manufactured by Kyoeisha Chemical Co., Ltd.) and 119.5 g of n-butyl bromide (manufactured by Tokyo Chemical Industry Co., Ltd.) were placed in an autoclave with a rotary mechanism, and were reacted at a temperature of 60° C. for 3 hours. Next, the reaction mixture was cooled to 5° C., and the solvent was distilled off under reduced pressure to yield dimethyl-n-butylethyl methacrylate bromide (monomer A-1).

TABLE 1

| Materials | Production Example A1 | Production Example A2 | Production Example A3 | Production Example A4 | Production Example A5 | Production Example A6 |
|---|---|---|---|---|---|---|
| Dry tetrahydrofuran | 500 | 500 | 500 | 500 | 500 | 500 |
| Dimethylaminoethyl methacrylate (trade name: Light Ester DM; manufactured by Kyoeisha Chemical Co., Ltd.) | 130.5 | 93.8 | 77.5 | 93.4 | — | — |
| 4-Vinylpyridine (manufactured by Tokyo Chemical Industry Co., Ltd.) | — | — | — | — | 103.3 | — |
| 2-Vinylpyridine (manufactured by Tokyo Chemical Industry Co., Ltd.) | — | — | — | — | — | 94.3 |
| n-Butyl bromide (manufactured by Tokyo Chemical Industry Co., Ltd.) | 119.5 | — | — | — | — | — |
| Lauryl bromide (manufactured by Tokyo Chemical Industry Co., Ltd.) | — | 156.2 | — | 156.6 | — | — |
| Stearyl bromide (manufactured by Tokyo Chemical Industry Co., Ltd.) | — | — | 172.5 | — | — | — |
| Methyl bromide (manufactured by Tokyo Chemical Industry Co., Ltd.) | — | — | — | — | 146.7 | — |
| Hexyl bromide (manufactured by Tokyo Chemical Industry Co., Ltd.) | — | — | — | — | — | 155.7 |

In the table, numeric values each indicate mass in "g."

[Production Examples A2 to A6] Synthesis of Monomers A-2 to A-6

Monomers A-2 to A-6 were prepared in the same manner as in Production Example A1 except that the types and amounts of the materials placed in the autoclave were varied as shown in Table 1 above.

(Monomer A-2): dimethyl-laurylethyl methacrylate bromide, (Monomer A-3): dimethyl-stearylethyl methacrylate bromide, (Monomer A-4): dimethyl-laurylpropylacrylamide bromide, (Monomer A-5): 4-vinyl-1-methylpyridinium bromide, and (Monomer A-6): 2-vinyl-1-hexylpyridinium bromide.

[Production Example B1] Synthesis of Polymer B-1

150.0 parts by mass of dry methyl ethyl ketone was placed in a reaction container provided with a stirrer, a thermometer, a reflux tube, a dropping apparatus and a nitrogen gas introducing pipe, and was heated to a temperature of 87° C. under a stream of nitrogen gas to be refluxed by heating. Next, a mixture of 42.4 parts by mass of dimethylaminoethyl methacrylate (trade name: Light Ester DM; manufactured by Kyoeisha Chemical Co., Ltd.), 7.6 parts by mass of n-lauryl methacrylate (trade name: Light Ester L; manufactured by Kyoeisha Chemical Co., Ltd.) and 0.3 parts by mass of an initiator (trade name: Kayaester O; manufactured by Kayaku Akzo Corporation) was gradually dropped over 1 hour. The reaction mixture was refluxed by heating for another 3 hours while the temperature was kept at 87° C. Next, the temperature was lowered to 50° C., and 100.0 parts by mass of methyl ethyl ketone was distilled off under reduced pressure. The product was left to stand to be cooled to room temperature. Polymer B-1 was thus yielded.

[Production Examples B2 to B18] Synthesis of Polymers B-2 to B-18

Polymers B-2 to B-18 were prepared in the same manner as in Production Example B1 except that the types and amounts of the monomers to be fed to the reaction were varied as shown in Table 2 below.

TABLE 2

| Production Example | No. | Monomer containing structure represented by structural formula (1) | | | Monomer containing structure represented by structural formula (2) | | |
|---|---|---|---|---|---|---|---|
| | | Type of monomer | Structure contained | Parts by mass | Type of monomer | Structure contained | Parts by mass |
| B1 | B-1 | Dimethylaminoethyl methacrylate | (1)/(5) | 42.4 | — | — | — |
| B2 | B-2 | Dimethylaminoethyl acrylate | | 41.8 | — | — | — |
| B3 | B-3 | Diethylaminoethyl methacrylate | | 43.4 | — | — | — |
| B4 | B-4 | Dimethylaminoethyl methacrylate | | 46.7 | — | — | — |
| B5 | B-5 | Monomer A-1 | (1)/(6) | 26.8 | — | — | — |
| B6 | B-6 | Monomer A-2 | | 30.8 | — | — | — |
| B7 | B-7 | Monomer A-3 | | 41.5 | — | — | — |
| B8 | B-8 | — | — | — | Dimethylaminopropyl acrylamide | (2)/(5) | 19.0 |
| B9 | B-9 | — | — | — | Monomer A-4 | (2)/(6) | 30.7 |
| B10 | B-10 | — | — | — | — | — | — |
| B11 | B-11 | — | — | — | — | — | — |
| B12 | B-12 | Dimethylaminoethyl methacrylate | (1)/(5) | 8.4 | — | — | — |
| | | Monomer A-3 | (1)/(6) | 26.2 | | | |
| B13 | B-13 | Dimethylaminoethyl methacrylate | (1)/(5) | 18.1 | Dimethylaminopropyl acrylamide | (2)/(5) | 17.9 |
| B14 | B-14 | Monomer A-3 | (1)/(6) | 24.1 | Monomer A-4 | (2)/(6) | 19.9 |
| B15 | B-15 | Dimethylaminoethyl methacrylate | (1)/(5) | 16.4 | — | — | — |
| B16 | B-16 | | | 14.6 | Dimethylaminopropyl acrylamide | (2)/(5) | 9.7 |
| B17 | B-17 | | | 50.0 | — | — | — |
| B18 | B-18 | Monomer A-3 | (1)/(6) | 50.0 | — | — | — |

| Production Example | No. | Monomer containing structure represented by structural formula (3) | | | Monomer containing structure represented by structural formula (4) | |
|---|---|---|---|---|---|---|
| | | Type of monomer | Structure contained | mol % | Type of monomer | Parts by mass |
| B1 | B-1 | — | — | — | n-Lauryl methacrylate | 7.6 |
| B2 | B-2 | — | — | — | | 8.2 |
| B3 | B-3 | — | — | — | | 6.6 |
| B4 | B-4 | — | — | — | Methyl acrylate | 3.3 |
| B5 | B-5 | — | — | — | n-Lauryl methacrylate | 23.2 |
| B6 | B-6 | — | — | — | | 19.2 |
| B7 | B-7 | — | — | — | Methyl acrylate | 8.5 |
| B8 | B-8 | — | — | — | n-Lauryl methacrylate | 31.0 |
| B9 | B-9 | — | — | — | | 19.3 |
| B10 | B-10 | Monomer A-5 | (3)/(7) | 22.0 | | 28.0 |
| B11 | B-11 | Monomer A-6 | (3)/(8) | 25.8 | | 24.2 |
| B12 | B-12 | — | — | — | n-Stearyl methacrylate | 15.5 |
| B13 | B-13 | — | — | — | n-Butyl methacrylate | 14.0 |
| B14 | B-14 | — | — | — | | 59.9 |
| B15 | B-15 | Monomer A-5 | (3)/(7) | 20.9 | | 12.7 |
| B16 | B-16 | | (3)/(7) | 12.4 | | 13.2 |

TABLE 2-continued

| | | | | | | |
|---|---|---|---|---|---|---|
| B17 | B-17 | — | — | — | — | — |
| B18 | B-18 | — | — | — | — | — |

Dimethylaminoethyl methacrylate (trade name: Light Ester DM; Kyoeisha Chemical Co., Ltd.)
Dimethylaminoethyl acrylate (trade name: ARON DA; TOAGOSEI CO., LTD.)
Diethylaminoethyl methacrylate (trade name: Light Ester DE; Kyoeisha Chemical Co., Ltd.)
Dimethylaminopropyl acrylamide (trade name: DMAPAA; KJ Chemicals Corporation)
n-Lauryl methacrylate (trade name: Light Ester L; Kyoeisha Chemical Co., Ltd.)
Methyl acrylate (Mitsubishi Chemical Corporation)
n-Stearyl methacrylate (trade name: Light Ester S; Kyoeisha Chemical Co., Ltd.)
n-Butyl methacrylate (trade name: Light Ester NB; Kyoeisha Chemical Co., Ltd.)

[Production Example C1] Synthesis of Isocyanate Group-Terminated Prepolymer C-1

Under a nitrogen atmosphere, 81.4 parts by mass of polymeric MDI (trade name: Millionate MR-200; manufactured by Tosoh Corporation) was placed in a reaction container. While the inner temperature of the reaction container was kept at 65° C., 100.0 parts by mass of carbonate polyol (trade name: Kuraray Polyol C-1090; manufactured by Kuraray Co., Ltd., 3-methyl-1,5-pentanediol:1,6-hexanediol=9:1, weight average molecular weight=1000, the number of functional group=2) was gradually dropped. After the dropping was completed, the mixture was reacted at a temperature of 65° C. for 3 hours, and 80.0 parts by mass of methyl ethyl ketone was added. The resulting reaction mixture was cooled to room temperature to yield isocyanate group-terminated urethane prepolymer C-1 (content of the isocyanate group: 5.8% by weight).

[Production Example C2] Synthesis of Isocyanate Group-Terminated Prepolymer C-2

The reaction and cooling were performed in the same manner as in Production Example C1 except that the raw materials were varied as shown in Table 3 below. Isocyanate group-terminated urethane prepolymer C-2 was thus yielded (content of the isocyanate group: 5.5% by weight).

TABLE 3

| Materials | Production Example C1 | Production Example C2 |
|---|---|---|
| Polymeric MDI (trade name: Millionate MR-200: manufactured by Tosoh Corporation) | 81.4 | 79.1 |
| Kuraray Polyol C-1090 (trade name: manufactured by Kuraray Co., Ltd.) | 100 | — |
| PTG-L1000 (trade name: manufactured by Hodogaya Chemical Co., Ltd.) | — | 100 |

In the table, numeric values are expressed in parts by mass.

[Production Example D1] Preparation of Coating Material D-1 for Forming Surface Layer A gas blowing tube, a dry ice condenser, a stirrer and a thermometer were attached to a four-necked flask. The inside of the system was sufficiently purged with nitrogen, and was dried. 350 ml of dry pyridine was placed in the four-necked flask, and was kept at a solution temperature of −5° C. In the next step, while this liquid was being stirred, 63.4 g of dichlorosilane gas (manufactured by TAKACHIHO CHEMICAL INDUSTRIAL CO., LTD.) was blown into the four-necked flask at a rate of 200 ml/min to produce an adduct product. Furthermore, while this liquid was being stirred, ammonia gas dried through a sodium hydroxide tower and an activated carbon tube was blown into the four-necked flask at a rate of 20.0 ml/min. The blowing of the ammonia gas was stopped when generation of heat was stopped. The liquid in the four-necked flask was washed with dry pyridine, and was further filtered under a dry nitrogen atmosphere. The solvent was removed from the filtrate under reduced pressure. While the resulting liquid was being stirred with a stirring motor, a mixed solvent of 100.0 g of xylene/0.5 g of triethylamine was gradually added. The mixed solution was further mixed by stirring with the stirring motor for 20 minutes to prepare coating material D-1 for forming a surface layer (solid content: 20.0% by mass). The coating material was evaluated by IR spectroscopy. A characteristic absorption spectrum derived from aSi-H group was found near 2200 $cm^{-1}$.

[Production Examples D2 and D3] Preparation of Coating Materials D-2 and D-3 for Forming Surface Layer Coating materials D-2 for forming a surface layer (solid content: 20.0% by mass) and D-3 (solid content: 20.0% by mass) were prepared in the same manner as in Production Example D1 except that the silane raw material and the amount thereof added were varied as shown in Table 4 below.

TABLE 4

| Solution | Silane raw material | Amount added (g) |
|---|---|---|
| Coating material for forming surface layer D-1 | Dichlorosilane (manufactured by TAKACHIHO CHEMICAL INDUSTRIAL CO., LTD.) | 63.4 |
| Coating material for forming surface layer D-2 | (3-Dichloroethylsilyl)Propylamine (manufactured by 3B-scientific corp.) | 116.8 |
| Coating material for forming surface layer D-3 | [(2,2-Dichloroethoxy)methyl]silane (manufactured by 3B-scientific corp.) | 99.8 |

[Production Example D4] Preparation of Coating Material D-4 for Forming Surface Layer The materials (the types and the amounts are shown in Table 5 below) as hydrolyzable silane compounds were mixed with 25.9 g of water and 69.3 g of ethanol, and were stirred at room temperature. Subsequently, the solution was refluxed by heating for 24 hours. A mixed solvent of 150 g of methyl ethyl ketone/150 g of ethanol was added to adjust the solid content to be 2.0% by mass. To 100 g of the solution, 0.34 g of a photocationic polymerization initiator (trade name: Adeka OPTOMER SP150; manufactured by Adeka Corporation) was added to prepare coating material D-4 for forming a surface layer.

TABLE 5

| Hydrolyzable silane compound | Amount added (g) |
|---|---|
| Methyltriethoxysilane (manufactured by Tokyo Chemical Industry Co., Ltd.) | 26.8 |
| 3-Glycidyloxypropyltrimethoxysilane (manufactured by Tokyo Chemical Industry Co., Ltd.) | 35.5 |

[Production Example D5] Preparation of Coating Material D-5 for Forming Surface Layer 1.0 g of an acrylic polymer (Hitaloid HA1470; manufactured by Hitachi Chemical Company, Ltd.) was dissolved in 99.0 g of methyl ethyl ketone to prepare coating material D-5 for forming a surface layer (solid content: 1.0% by mass).

[Preparation and Evaluation of Developing Rollers]

Examples 1 to 23 and Comparative Examples 1 to 5 are related with preparation and evaluation of conductive rollers, and evaluation of developing rollers.

Example 1

1. Preparation of Elastic Roller

A primer (trade name, DY35-051; manufactured by Dow Corning Toray Co., Ltd.) was applied onto a stainless steel (SUS304) substrate having a diameter of 6 mm, and was baked for 20 minutes in an oven heated to a temperature of 180° C. to prepare a substrate. The substrate was disposed inside a metal mold. An addition silicone rubber composition including a mixture of the materials shown in Table 6 below was injected into the cavity defined in the metal mold.

TABLE 6

| Materials | Parts by mass |
|---|---|
| Liquid silicone rubber material (trade name: SE6905A/B, manufactured by Dow Corning Toray Co., Ltd.) | 100 |
| Carbon black (trade name: DENKA Black powder, manufactured by DENKA Company Limited) | 10 |
| Silica powder as heat resistance imparting agent | 5 |
| Platinum catalyst | 0.1 |

Subsequently, the metal mold was heated at a temperature of 150° C. for 15 minutes to cure the silicone rubber through vulcanization. A roller including the substrate and the cured silicone rubber layer formed around the circumferential surface thereof was removed from the metal mold, and was further heated at a temperature 180° C. for 1 hour to complete the curing reaction of the silicone rubber layer. An elastic roller including the substrate and the silicone rubber layer formed on the outer periphery thereof and having an outer diameter of 12 mm was thus prepared.

2. Formation of Intermediate Layer

The materials shown in Table 7 below were mixed by stirring. Next, methyl ethyl ketone was added such that the proportion of the total solid content was 30% by mass, and the materials were mixed with a sand mill. Furthermore, methyl ethyl ketone was added to adjust the viscosity to be 10 to 12 cps. A coating material for forming an intermediate layer was thus prepared.

TABLE 7

| Materials | Parts by mass |
|---|---|
| Polyol (trade name: Kuraray Polyol C-2090; manufactured by Kuraray Co., Ltd.) | 55.3 |
| Isocyanate group-terminated prepolymer C-1 | 55.9 |
| Carbon black (trade name: MA230; manufactured by Mitsubishi Chemical Corporation) | 20 |
| Urethane resin fine particle (trade name: Art-pearl C-400; manufactured by Negami Chemical Industrial Co., Ltd.) | 15 |
| Polymer B-1 | 3 |

In the next step, the elastic roller was immersed in the coating material for forming an intermediate layer to form a coating of the coating material on the surface of the elastic layer of the elastic roller. The coating was dried at room temperature for 30 minutes. Furthermore, the coating was subjected to a heat treatment at a temperature of 150° C. for 1 hour to form an intermediate layer having a thickness of about 15 μm on the outer periphery of the elastic layer.

3. Formation of Surface Layer

First, coating material D-2 for forming a surface layer preliminarily prepared was diluted with xylene such that the solid content was 5.0% by mass. The elastic roller including the intermediate layer prepared above was immersed in this diluted coating material to form a surface layer. Specifically, the coating of the diluted coating material was formed on the surface of the intermediate layer using an immersion coating method in which the coating material was overflowed from the upper end of an immersion tank, as described in Japanese Patent Application Laid-Open No. S57-5047. The rate of the elastic roller entering the immersion tank was 500 mm/min, the holding time at the lowest point was 1 second, and the rate to extract the elastic roller from the immersion tank was 400 mm/min.

After the formation of the coating of the diluted coating material, the coating was dried at room temperature (temperature: 25° C.) for 10 minutes. In the next step, the coating was heated under an environment at a temperature of 80° C. and a relative humidity of 90% for 2 hours to be cured. A surface layer was thus formed. Conductive roller 1 was thus prepared. The thickness was 148 nm.

4. Evaluation

"Sheet 1" was prepared by the following method to measure the amounts of silica adhered to the intermediate layer and the surface layer and the triboelectric charging quantity. 2.0 g of the coating material for forming an intermediate layer was applied onto a stainless steel (SUS304) thin plate with a bar coater (#120), and the coating was cured by heating. Subsequently, 2.0 g of coating material D-1 for forming a surface layer was applied with a bar coater (#120), and the coating was cured by heating. The curing by heating was performed on the same conditions as those in production of conductive roller 1. The resulting sheet was used to perform "evaluation of sheet" by the following method. The results of evaluation are shown in Table 10.

4-1. Evaluation of Adhesiveness

Sheet 1 was left to stand under an environment at a temperature of 50° C. and a relative humidity 95% for 60 days. Subsequently, sheet 1 was left to stand at room temperature for 12 hours. Based on Japanese Industrial Standards (JIS) K5600-5-6:1999 (ISO 2409:1992) "Testing methods for paints—Part 5: Mechanical property of film—

Section 6: Adhesion test (Cross-cut test), the adhesive properties of the surface layer and the intermediate layer were evaluated.

Rank A: no peel-off of cut portions in the form of a lattice is found.

Rank B: peel-off of cut portions is slightly found in portions where cutting lines cross (clearly below 5% of the cut portions).

Rank C: cut portions are peeled along the cutting lines in portions where the cutting lines cross (5% or more and less than 15% of the cut portions).

Rank D: cut portions are peeled along the cutting lines across the cut portions.

Rank E: cut portions are significantly peeled across the cut portions.

4-2. Amount of Silica Adhered

Here, an amount of silica adhered under an environment at high temperature and high humidity was evaluated.

3.0 g of hydrophobic silica (trade name: Aerosil R972, manufactured by Nippon Aerosil Co., Ltd.) was applied onto sheet 1. In the next step, a polytetrafluoroethylene flat plate was disposed thereover. The flat plate was pressed against sheet 1 under a load of 2.94 N. The sheet was left to stand under an environment at a temperature of 40° C. and a relative humidity of 95% for 10 minutes. In the next step, sheet 1 was freed from being pressed against the flat plate, and the surface of sheet 1 was blown by air. Subsequently, the mass of sheet 1 was measured. The mass $m_0$ of the sheet before application of silica was subtracted from the measured mass m of the sheet, and the resulting value "$m-m_0$" was defined as the amount of silica adhered.

4-3. Triboelectric Charging Quantity of Sheet

Sheet 1 was left to stand under an environment at a temperature of 32° C. and a relative humidity 85% (hereinafter, referred to as "H/H environment") for 6 hours or longer. Subsequently, the triboelectric charging quantity was measured under the same environment according to the following procedure.

The measurement apparatus used was a cascade surface charge quantity measurement apparatus TS-100AT (trade name, manufactured by KYOCERA Chemical Corporation). The carrier used was a standard carrier N-01 (The Imaging Society of Japan). The time to drop the carrier was 10 seconds. The total charge quantity of the carrier dropped into a container disposed on an insulating plate was measured with an electrometer connected to a capacitor in parallel, and was defined as a charge quantity Q [μC]. Furthermore, the mass M (g) of the carrier dropped into the container was measured. From these values, the charge quantity Q/M per unit mass (μC/g) was calculated. The value was defined as the "triboelectric charging quantity of the sheet."

5. Evaluation of Developing Roller

Here, conductive roller 1 used as a developing roller was evaluated.

5-1. Evaluation of Fogging in Image

Conductive roller 1 as a developing roller was mounted on a magenta toner cartridge for a laser printer (trade name: HP Color Laserjet Enterprise CP4515dn, manufactured by Hewlett-Packard Company) having the configuration illustrated in FIG. 3. The toner cartridge was installed in the laser printer. The laser printer was left to stand under the H/H environment for 6 hours or longer. In the next step, an image of an alphabetical letter "E" (size: 4 point) having a coverage rate of 1% relative to the area of paper of size A4 when printed (hereinafter, also referred to as "E-letter image") was continuously output onto a predetermined number of photocopying sheets.

Subsequently, a white solid image was output onto a new photocopying sheet. The printer was turned off while the white solid image was being output. At this time, the toner adhering to the photoreceptor was removed with a tape (trade name, CT18; manufactured by NICHIBAN CO., LTD.), and the reflectance R was measured with a reflection densitometer (trade name, TC-6DS/A; manufactured by Tokyo Denshoku Co., Ltd.). Where the reflectance $R_0$ of the tape was used as a reference, a reduction in reflectance "$R_0-R$" (%) was measured, and was defined as a "fogging value."

The fogging value measured after the output of 100 sheets of the image having a coverage rate of 1% was defined as the "initial fogging value," and the fogging value measured after the output of 15000 sheets of the image having a coverage rate of 1% was defined as the "fogging value after the durability test."

5-2. Measurement of Triboelectric Charging Quantity of Toner

The triboelectric charging quantity was measured to evaluate the developing roller for its ability to impart charge to toners. In the evaluation of the fogging in images, the toner carried by a narrower portion of a portion sandwiched by the developing blade in the developing roller and the contact position between the developing roller and the photoreceptor was collected through suction with a metal cylindrical tube and a cylindrical filter. At this time, the amount of charges Q stored in the capacitor through the metal cylindrical tube (measurement apparatus: trade name, 8252; manufactured by ADC Corporation) and the mass M of the suctioned toner were measured. From these values, the amount of charges Q/M per unit mass (μC/g) was calculated. In use of a toner having negative charging properties, the amount of charges per unit mass has a negative (−) value. A greater absolute value of the amount of charges indicates that the developing roller has higher charge imparting ability. The measured Q/M value was defined as a "triboelectric charging quantity." Similarly to the evaluation of the fogging value, the value measured after the output of 100 sheets was defined as the "initial triboelectric charging quantity $W_1$ of the toner," and the value measured after the output of 15000 sheets was defined as the "triboelectric charging quantity $W_2$ of the toner after the durability test." The value of $W_2/W_1$ was calculated, and was defined as the "charge quantity retention rate."

Examples 2 to 18

Conductive rollers 2 to 18 and sheets 2 to 18 were prepared in the same manner as in Example 1 except that the polymer contained in the intermediate layer, the amount thereof used, and the coating material for forming a surface layer were varied as shown in Table 9, and were evaluated in the same manner as in Example 1. The results of evaluation are shown in Table 10.

Example 19

1. Formation of Intermediate Layer

The materials shown in Table 8 below were mixed by stirring. Next, methyl ethyl ketone was added such that the proportion of the total solid content was 30% by mass, and the materials were mixed with a sand mill. Furthermore, methyl ethyl ketone was added to adjust the viscosity to be 10 to 12 cps. A coating material 19 for forming an intermediate layer was thus prepared. Except for these, the operation was performed in the same manner as in Example 1 to form an intermediate layer having a thickness of about 15 μm on the outer periphery of the substrate.

TABLE 8

| Materials | Parts by mass |
|---|---|
| Polyol (trade name: PTG-L1000; manufactured by Hodogaya Chemical Co., Ltd.) | 36.9 |
| Isocyanate group-terminated prepolymer C-2 | 78.6 |
| Carbon black (trade name: MA230; manufactured by Mitsubishi Chemical Corporation) | 20 |
| Urethane resin fine particle (trade name: Art-pearl C-400; manufactured by Negami Chemical Industrial Co., Ltd.) | 15 |
| Polymer B-17 | 1 |

2. Formation of Surface Layer

Figure 4:
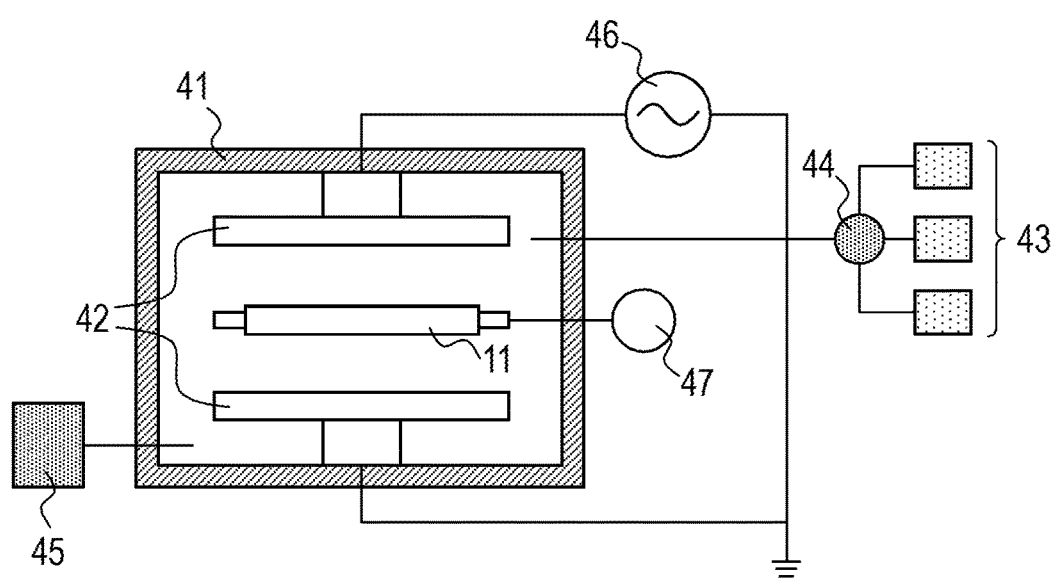
FIG. 4 is a schematic view of a SiOx film producing apparatus by plasma CVD.

The roller including the intermediate layer formed thereon was placed in the plasma CVD apparatus illustrated in FIG. 4. The plasma CVD apparatus includes a vacuum chamber 41, flat plate electrodes 42 disposed in parallel to each other, a raw material gas cylinder and a raw material liquid tank 43, a raw material feeding unit 44, a gas discharging unit 45 for discharging gas in the chamber, a high frequency feeding power supply 46 for feeding high frequency, and a motor 47 for rotating the elastic roller 11.

Subsequently, the inner pressure of the vacuum chamber was reduced to 1 Pa using a vacuum pump. Subsequently, a mixed gas of a steam of hexamethyldisiloxane (1.0 sccm), oxygen (1.5 sccm), and argon gas (22.5 sccm) as raw material gases was introduced into the vacuum chamber. The inner pressure of the vacuum chamber at this time was 25.3 Pa. After the pressure reached a predetermined value, electricity at a frequency of 13.56 MHz and 120 W was fed to the flat plate electrodes by the high frequency power supply to generate plasma between the electrodes. The roller disposed inside the vacuum chamber was rotated at 24 rpm to be treated for 20 seconds. After the treatment was completed, the feeding of the electricity was stopped. The residual raw material gases in the vacuum chamber were discharged, and the air was introduced into the vacuum chamber until the inner pressure of the vacuum chamber reached the atmospheric pressure. Subsequently, conductive roller 19 including a surface layer formed thereon was extracted. The thickness of surface layer was measured in the same manner as in Example 1. The thickness was 210 nm.

An intermediate layer and a surface layer according to the present Example were formed on a stainless steel (SUS304) sheet by the same method as the method of preparing "sheet 1" in Example 1 to prepare sheet 19.

3. Evaluation

Evaluation was performed for the same items in the same manner as in Example 1. The results of evaluation are shown in Table 10.

Example 20

1. Formation of Intermediate Layer

An intermediate layer having a thickness of about 15 μm was formed on the outer periphery of a substrate in the same manner as in Example 19.

2. Formation of Surface Layer

Figure 6:
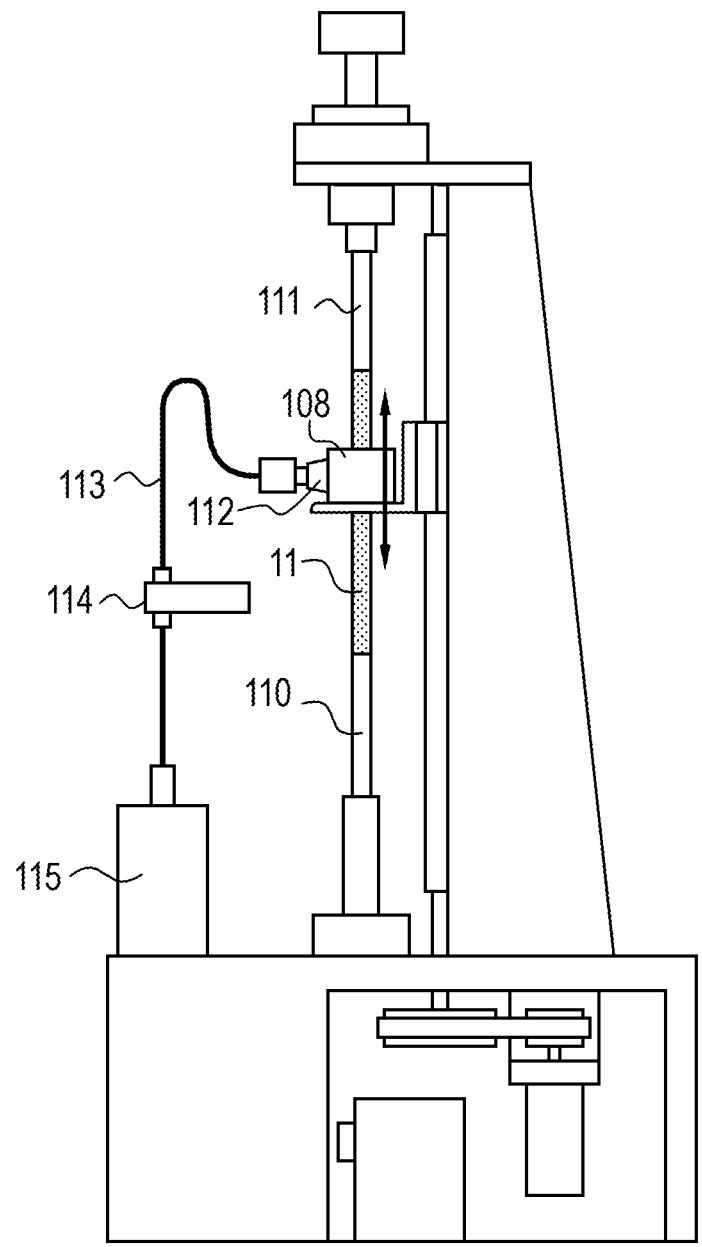
FIG. 6 is a conceptual diagram illustrating a coating apparatus which applies a coating solution onto the surface of a roller with a ring coating head.

Using a coating apparatus having the configuration illustrated in FIG. 6, coating material D-4 for forming a surface layer was applied onto the roller including the intermediate layer formed thereon. A coating of the coating material was formed on the surface of the intermediate layer by the following operation.

Figure 5:
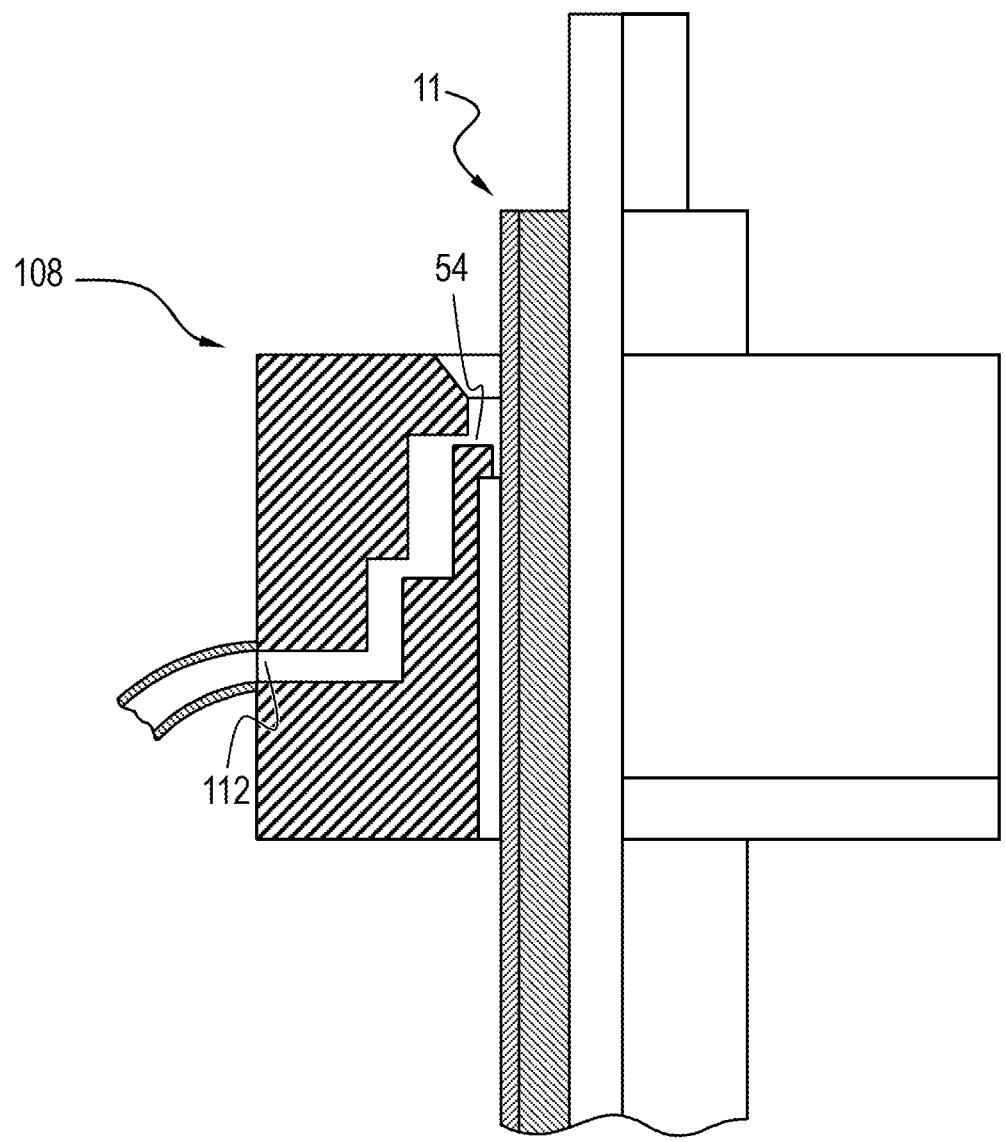
FIG. 5 is a cross-sectional view illustrating a half of the structure of a ring coating head.

FIG. 5 is a partially enlarged view of a ring coating head 108 illustrated in FIG. 6. The ring coating head includes an ejection port 54 having an opening width (slit width) of 0.2 mm. The ejection port 54 of the ring coating head 108 has an inner diameter of 12.25±0.02 mm. In the coating apparatus of FIG. 6, an upper workpiece holding shaft 111 was vertically moved to vertically fix the roller 11 including the intermediate layer formed thereon between a lower workpiece holding shaft 110 having an outer diameter of 12.0 mm and the upper workpiece holding shaft having an outer diameter of 12.0 mm. Next, the ring coating head 108 was ascended such that the ejection port 54 of the ring coating head 108 was moved to an ascending end position, which was located 10 mm above from the topmost end of the elastic layer of the roller 11 including the intermediate layer formed thereon. The ring coating head 108 was once stopped on the upper workpiece holding shaft 111. Coating material D-4 for forming a surface layer was placed in an air-tight container or a tank 115, and was stirred with a stirrer. While coating material D-4 was being stirred, the feeding of the coating material into the ring coating head was performed for 3 seconds from the tank through a solution feeding unit or a syringe pump 114, and a tube 113 connected to a single solution feeding port 112 provided on the ring coating head 108. The coating material was ejected from the ejection port 54 in the form of an annular slit at the stop position to form a pool of solution on the outer periphery of the upper workpiece holding shaft 111. After the formation of the pool of solution, while the ring coating head 108 was being descended, the coating solution was homogeneously ejected onto the entire circumference of the roller 11 to form a coating on the roller. The descending rate of the ring coating head was 10 mm/sec, and the ejection rate of the coating material was 0.03 mL/sec. The ejection of the coating material was stopped when the ejection port descended to a position 10 mm below the lowermost end of the elastic layer of the roller 11. Subsequently, the ring coating head was descended to a preset descending position on the lower workpiece holding shaft, and was stopped.

Using a low pressure mercury lamp (manufactured by TOSHIBA LIGHTING & TECHNOLOGY CORPORATION), the roller having the coating formed thereon was irradiated with ultraviolet light having a wavelength of 254 nm such that the accumulated amount of light was 9000 mJ/cm$^2$. The coating was thereby cured to form a surface layer. Conductive roller 20 was thus prepared. The thickness of the surface layer after curing was 143 nm. An intermediate layer according to the present Example was formed on a stainless steel (SUS304) sheet by the same method as the method of preparing "sheet 1" according to Example 1. In the next step, a surface layer was formed on the surface of the intermediate layer by the method described in Section 2 above to prepare sheet 20.

3. Evaluation

Evaluation was performed for the same items in the same manner as in Example 1. The results of evaluation are shown in Table 10.

Examples 21 to 23

An intermediate layer was formed on the outer periphery of each substrate in the same manner as in Example 19 except that the polymer used was polymer B-18. A surface layer was formed in the same manner as in Example 1 except that the types and amounts of the coating material for forming a surface layer were varied as shown in Table 9. Conductive rollers 21 to 23 and sheets 21 to 23 were prepared, and were evaluated for the same items in the same manner as in Example 1. The results of evaluation are shown in Table 10.

Comparative Example 1

Conductive roller C1 and sheet C1 were prepared in the same manner as in Example 1 except that coating material D-2 for forming a surface layer was used in the amount shown in Table 9, and the coating step to the drying step before the thermal curing step were repeated twice. Conductive roller C1 and Sheet C1 were evaluated for the same items in the same manner as in Example 1. The thickness of the surface layer at this time was 480 nm.

Comparative Example 2

Conductive roller C2 and sheet C2 were prepared in the same manner as in Example 1 except that the polymer contained in the intermediate layer, the amount thereof used, and the coating material for forming a surface layer were varied as shown in Table 9, and were evaluated for the same items in the same manner as in Example 1. The thickness of the surface layer at this time was 3 nm.

Comparative Examples 3 and 4

Conductive rollers C3 and C4 and sheets C3 and C4 were prepared in the same manner as in Example 20 except that the polymer contained in the intermediate layer, the amount thereof used, and the coating material for forming a surface layer were varied as shown in Table 9, and were evaluated for the same items in the same manner as in Example 1.

Comparative Example 5

An intermediate layer was formed on an elastic roller in the same manner as in Example 1 except that the polymer contained in the intermediate layer and the amount thereof used were varied as shown in Table 9. Conductive roller C5 and sheet C5 each having the outermost layer including the resin for forming the intermediate layer were thus prepared, and were evaluated for the same items in the same manner as in Example 1. It should be noted that in this Comparative Example, "4-1. Evaluation of adhesiveness" was not performed.

TABLE 9

| | Preparation of conductive roller (developing roller) | | | | | | |
|---|---|---|---|---|---|---|---|
| | Intermediate layer | | | Surface layer | | | |
| | Polymer | | | Coating material | | | |
| | No. | Amount used (parts by mass) | Binder resin | for forming surface layer | Solid content (% by mass) | Thickness after curing (nm) | |
| Example 1 | B-1 | 3 | (Carbonate urethane) C-2090/C-1 | D-2 | 5 | 149 | |
| Example 2 | B-2 | | | | | | |
| Example 3 | B-3 | | | | | | |
| Example 4 | B-4 | | | | | | |
| Example 5 | B-5 | | | | | | |
| Example 6 | B-6 | | | | | | |
| Example 7 | B-7 | | | | | | |
| Example 8 | B-8 | | | | | | |
| Example 9 | B-9 | | | | | | |
| Example 10 | B-10 | | | | | | |
| Example 11 | B-11 | | | | | | |
| Example 12 | B-1 | | | | 20 | 290 | |
| Example 13 | | | | | 1 | 12 | |
| Example 14 | B-12 | | | D-3 | 5 | 153 | |
| Example 15 | B-13 | | | | | | |
| Example 16 | B-14 | | | | | | |
| Example 17 | B-15 | | | | | | |
| Example 18 | B-16 | | | | | | |
| Example 19 | B-17 | 1 | (Ether urethane) PTG-L1000/C-2 | — | — | 210 | |
| Example 20 | | | | D-4 | 2 | 143 | |
| Example 21 | B-18 | | | D-1 | 5 | 151 | |
| Example 22 | | | | | 20 | 288 | |
| Example 23 | | | | | 0.5 | 15 | |
| Comparative Example 1 | B-1 | 3 | (Carbonate urethane) C-2090/C-1 | D-2 | 20 | 480 | |
| Comparative Example 2 | | | | | 0.1 | 3 | |
| Comparative Example 3 | | | | D-5 | 1 | 120 | |
| Comparative Example 4 | POLYMENT NK380 (NIPPON SHOKUBAI CO., LTD.) | | | D-2 | 5 | 148 | |

TABLE 9-continued

Preparation of conductive roller (developing roller)

| | Intermediate layer | | | Surface layer | | |
|---|---|---|---|---|---|---|
| | Polymer | | | Coating material for forming surface layer | Solid content (% by mass) | Thickness after curing (nm) |
| No. | | Amount used (parts by mass) | Binder resin | | | |
| Comparative Example 5 | B-1 | 5 | (Ether urethane) PTG-L1000/C-2 | — | — | — |

C-2090: manufactured by Kuraray Co., Ltd.
PTG-L1000: manufactured by Hodogaya Chemical Co., Ltd.

TABLE 10

| | Evaluation of developing roller | | | | | | |
|---|---|---|---|---|---|---|---|
| | Evaluation of sheet | | | Initial | Triboelectric charging | Charge quantity |
| | Adhesiveness | Amount of silica adhered (mg) | Triboelectric charging quantity (µC/g) | Initial fogging (%) | Fogging after durability test (%) | Initial triboelectric charging quantity of toner (µC/g) | quantity of toner after durability test (µC/g) | retention rate (after durability test/initial) |
|---|---|---|---|---|---|---|---|---|
| Example 1 | A | 0.15 | −4.2 | 1.1 | 1.2 | −43 | −40 | 0.93 |
| Example 2 | A | 0.14 | −4.1 | 1.1 | 1.3 | −42 | −40 | 0.95 |
| Example 3 | A | 0.14 | −4.3 | 1 | 1 | −43 | −42 | 0.98 |
| Example 4 | A | 0.15 | −4.0 | 1.1 | 1.2 | −40 | −38 | 0.95 |
| Example 5 | A | 0.15 | −3.9 | 1.2 | 1.4 | −38 | −36 | 0.95 |
| Example 6 | A | 0.15 | −3.9 | 1.2 | 1.4 | −39 | −35 | 0.90 |
| Example 7 | A | 0.14 | −3.8 | 1.1 | 1.2 | −38 | −37 | 0.97 |
| Example 8 | A | 0.15 | −4.1 | 1 | 1.3 | −42 | −39 | 0.93 |
| Example 9 | A | 0.15 | −3.8 | 1.2 | 1.5 | −38 | −34 | 0.89 |
| Example 10 | A | 0.16 | −3.8 | 1.3 | 1.7 | −37 | −36 | 0.97 |
| Example 11 | A | 0.14 | −3.7 | 1.2 | 1.8 | −38 | −37 | 0.97 |
| Example 12 | A | 0.13 | −4 | 1 | 1.3 | −41 | −38 | 0.93 |
| Example 13 | A | 0.14 | −4.3 | 1 | 1.1 | −44 | −40 | 0.91 |
| Example 14 | A | 0.15 | −4.2 | 1.2 | 1.2 | −42 | −40 | 0.95 |
| Example 15 | A | 0.14 | −4.1 | 0.9 | 1 | −43 | −41 | 0.95 |
| Example 16 | A | 0.13 | −3.8 | 1.3 | 1.5 | −37 | −35 | 0.95 |
| Example 17 | A | 0.14 | −4 | 0.9 | 1.4 | −41 | −39 | 0.95 |
| Example 18 | A | 0.15 | −4 | 1 | 1.2 | −42 | −40 | 0.95 |
| Example 19 | A | 0.13 | −3.4 | 1.5 | 2.1 | −33 | −31 | 0.94 |
| Example 20 | A | 0.16 | −3.3 | 1.5 | 2.2 | −34 | −31 | 0.91 |
| Example 21 | A | 0.13 | −3.4 | 1.5 | 2.1 | −32 | −31 | 0.97 |
| Example 22 | A | 0.14 | −3.3 | 1.6 | 2.1 | −33 | −31 | 0.94 |
| Example 23 | A | 0.14 | −3.2 | 1.6 | 2 | −32 | −30 | 0.94 |
| Comparative Example 1 | A | 0.14 | −2.8 | 4 | 5.2 | −25 | −23 | 0.92 |
| Comparative Example 2 | A | 0.15 | −4.3 | 0.9 | 5.1 | −42 | −27 | 0.64 |
| Comparative Example 3 | A | 0.15 | −2.7 | 1.3 | 5.4 | −25 | −22 | 0.88 |
| Comparative Example 4 | A | 0.14 | −2.7 | 4.7 | 5.5 | −26 | −24 | 0.92 |
| Comparative Example 5 | — | 1.38 | −4.2 | 0.9 | 5.6 | −42 | −25 | 0.60 |

In the evaluation of the sheets in Examples, a small amount of silica adhered, and the sheets had favorable triboelectric charging quantities. In the evaluation of the developing rollers, these developing rollers had high triboelectric charging quantities of the toner both in the initial stage and after the durability test, and had favorable fogging values.

Among these developing rollers, since the developing rollers in Examples 1 to 18 included the intermediate layer having a structure represented by structural formula (4), these developing rollers had a high triboelectric charging quantity of the toner, and had a fogging value of less than 2% after the durability test. Since particularly the developing rollers in Examples 1 to 4, 8, 12 to 15, 17 and 18 included the intermediate layer having a structure represented by structural formula (1) or (2) in which X1 was represented by structural formula (5), these developing rollers had a high initial triboelectric charging quantity of the toner, and also retained a high triboelectric charging quantity of the toner after the durability test.

In Comparative Example 1 in which the surface layer had a large thickness of 480 nm, the triboelectric charging quantity was low in the evaluation of the sheet. The developing roller had a low initial triboelectric charging quantity of the toner, and had a high fogging value of 4% or more. It is considered that this was because such a large thickness of the surface layer reduced the charge imparting effect of the intermediate layer.

In Comparative Example 2 in which the surface layer was a thin film having a thickness of 3 nm, the triboelectric charging quantity was high in the evaluation of the sheet. The developing roller had a high initial triboelectric charging quantity of the toner but had a low triboelectric charging quantity of the toner after the durability test. With such a low triboelectric charging quantity, fogging also occurred.

In Comparative Example 3 in which the material for the outermost layer was a standard acrylic resin, and in Comparative Example 4 including a primary amine compound, the triboelectric charging quantity in the evaluation of the sheet and the initial triboelectric charging quantity of the toner were low, causing fogging.

In the Comparative Example 5 not having the outermost layer, the triboelectric charging quantity was high in the evaluation of the sheet, but a large amount of silica adhered. For this reason, silica readily adhered to the developing roller. As a result, the developing roller had a high initial triboelectric charging quantity of the toner but had a low triboelectric charging quantity of the toner after the durability test.

[Preparation and Evaluation of Developing Blade]

Examples 24 to 29 and Comparative Examples 6 to 9 are related with preparation and evaluation of developing blades.

Example 24

1. Preparation of Coating Material for Forming Elastic Layer

The materials shown in Table 11 below were mixed by stirring to prepare a coating material for forming an elastic layer of a developing blade.

TABLE 11

| Materials | Parts by mass |
| --- | --- |
| Amine polyol (trade name: EXCENOL 500ED; manufactured by ASAHI GLASS CO., LTD.) | 25.8 |
| Polyisocyanate (trade name: CORONATE L; manufactured by Tosoh Corporation) | 113.6 |
| Ionically conductive agent PEL-20A (manufactured by Japan Carlit Co., Ltd.) | 1.4 |
| Silica (trade name: AEROSIL 200; manufactured by Nippon Aerosil Co., Ltd.) | 10 |
| Methyl ethyl ketone | 150.8 |

2. Preparation of Coating Material for Forming Intermediate Layer

The materials shown in Table 12 below were mixed by stirring. Next, methyl ethyl ketone was added such that the proportion of the total solid content was 30% by mass, and the materials were mixed with a sand mill. In the next step, the viscosity of the mixture was adjusted to 10 to 12 cps with methyl ethyl ketone to prepare a coating material for forming an intermediate layer.

TABLE 12

| Materials | Parts by mass |
| --- | --- |
| PTG-L1000 (trade name: Polyether Polyol; manufactured by Hodogaya Chemical Co., Ltd.) | 71.9 |
| Isocyanate group-terminated prepolymer B-1 | 28.1 |
| PEL-100 (manufactured by Japan Carlit Co., Ltd.) | 9.6 |
| Silica (trade name: AEROSIL 200; manufactured by Nippon Aerosil Co., Ltd.) | 15 |

3. Preparation of Developing Blade

As a substrate, a stainless steel sheet (manufactured by Nisshin Steel Co., Ltd.) having a thickness of 0.08 mm was press cut into a piece having a length of 215 mm and a width of 23 mm. Next, a surface (lateral surface) of the cut stainless steel sheet having a length of 215 mm and a width of 23 mm was immersed in the coating material for forming an elastic layer at a depth of 1.5 mm to form a coating of the coating material on the lateral surface. The coating was dried at room temperature for 30 minutes. The coating was further subjected to a heat treatment at a temperature of 120° C. for 30 minutes to form an elastic layer having a thickness of 10 μm on the lateral surface of the SUS sheet.

Subsequently, the elastic layer formed in the blade was immersed in the coating material for forming an intermediate layer in the same manner as in the formation of the elastic layer to form a coating on the elastic layer. The coating was dried at room temperature for 30 minutes. The coating was further subjected to a heat treatment at a temperature of 150° C. for 1 hour to form an intermediate layer.

In the next step, the intermediate layer formed in the blade was immersed in coating material D-1 for forming a surface layer in the same manner as in the formation of the intermediate layer to form a coating. The coating was dried at room temperature for 10 minutes. The coating was further cured by heating under an environment at a temperature of 80° C. and a relative humidity of 90% for 2 hours to prepare developing blade 24. Here, the thickness of the surface layer after the curing was 160 nm.

The resulting developing blade was evaluated for the following items.

4. Evaluation

Developing blade 24 prepared above was mounted on a cyan toner cartridge for a laser printer (trade name: HP Color Laserjet Enterprise CP4515dn, manufactured by Hewlett-Packard Company). An image was output in the same manner as in Example 1 except that this cyan toner cartridge was used. "5-1. Evaluation of fogging in image" and "5-2. Measurement of triboelectric charging quantity of toner" were performed in the same manner as in Example 1. The results of evaluation are shown in Table 14.

Examples 25 to 29

Developing blades 25 to 29 were prepared in the same manner as in Example 24 except that the polymer contained in the intermediate layer, the amount thereof used, and the coating material for forming a surface layer were varied as shown in Table 13, and were evaluated for the same items in the same manner as in Example 24. The results of evaluation are shown in Table 14.

Comparative Examples 6 to 9

Developing blades C6 to C9 were prepared in the same manner as in Example 24 except that the polymer contained in the intermediate layer, the amount thereof used, and the coating material for forming a surface layer were varied as shown in Table 13, and were evaluated for the same items in the same manner as in Example 24. The results of evaluation are shown in Table 14. "POLYMENT NK380" (trade name, manufactured by NIPPON SHOKUBAI CO., LTD.) is an aminoethylated acrylic polymer.

ture represented by one of structural formulas (1) to (3), the initial fogging value was high. In Comparative Example 7 in which the material for the surface layer was an acrylic resin, and in Comparative Example 9 having no surface layer, the initial fogging value was low, but the fogging value after the durability test was high.

TABLE 13

Preparation of developing blade

| | Intermediate layer | | | Surface layer | | |
|---|---|---|---|---|---|---|
| | Polymer | | | Coating | | |
| No. | | Amount used (parts by mass) | Binder resin | material for forming surface layer | Solid content (% by mass) | Thickness after curing (nm) |
| Example 24 | B-1 | 3 | (Ether urethane) PTG-L1000/C-2 | D-2 | 5 | 145 |
| Example 25 | B-9 | | | | | |
| Example 26 | B-1 | | | | 20 | 290 |
| Example 27 | | | | | 1 | 12 |
| Example 28 | B-10 | | | D-4 | 2 | 143 |
| Example 29 | B-11 | | | D-1 | 5 | 151 |
| Comparative Example 6 | B-1 | 3 | | D-2 | 20 | 490 |
| Comparative Example 7 | | | | D-5 | 1 | 130 |
| Comparative Example 8 | POLYMENT NK380 (NIPPON SHOKUBAI CO., LTD.) | | | D-2 | 5 | 151 |
| Comparative Example 9 | B-3 | | | — | — | — |

TABLE 14

Evaluation of developing blade

| | Initial fogging (%) | Fogging after durability test (%) | Initial triboelectric charging quantity of toner (μC/g) | Triboelectric charging quantity of toner after durability test (μC/g) | Charge quantity retention rate (after durability test/initial) |
|---|---|---|---|---|---|
| Example 24 | 1.2 | 1.5 | −42 | −40 | 0.95 |
| Example 25 | 2 | 2.4 | −37 | −34 | 0.92 |
| Example 26 | 1.3 | 1.6 | −40 | −37 | 0.93 |
| Example 27 | 1.1 | 1.4 | −43 | −39 | 0.91 |
| Example 28 | 2 | 2.3 | −33 | −31 | 0.94 |
| Example 29 | 2.1 | 2.5 | −33 | −31 | 0.94 |
| Comparative Example 6 | 4.7 | 5.1 | −25 | −22 | 0.88 |
| Comparative Example 7 | 1.3 | 5.2 | −24 | −23 | 0.96 |
| Comparative Example 8 | 4.8 | 5.3 | −26 | −24 | 0.92 |
| Comparative Example 9 | 1.1 | 5.8 | −40 | −25 | 0.63 |

Examples 24 to 29 had good results (the fogging value was 3% or less both in the initial stage and after the durability test). Furthermore, the developing blades in Examples 24, 26 and 27 having a structure represented by structural formula (5) had better results (the fogging value was less than 2% in the initial stage and after the durability test). In contrast, in Comparative Example 6 in which the surface layer had a large thickness, and Comparative Example 8 including the intermediate layer having no struc-

[Preparation and Evaluation of Charging Roller]

Examples 30 to 35 and Comparative Examples 10 to 13 are related with preparation of conductive rollers and evaluation of charging rollers.

Example 30

1. Preparation of Rubber Composition

The materials shown in Table 15 below were mixed with a pressurized kneader to prepare A-kneaded rubber composition 1. Furthermore, 77 parts by mass of A-kneaded rubber composition 1 was mixed with other materials shown in Table 16 below using an open roll mill to prepare unvulcanized rubber composition 1.

TABLE 15

| Materials | Parts by mass |
|---|---|
| NBR rubber material (trade name, Nipol DN219; manufactured by ZEON Corporation) | 100 |
| Carbon black (trade name, TOKABLACK #7360SB; manufactured by Tokai Carbon Co., Ltd.) | 40 |
| Calcium carbonate (trade name, NANOX #30; manufactured by Maruo Calcium Co., Ltd.) | 20 |
| Stearic acid (trade name, Stearic acid S; manufactured by Kao Corporation) | 1 |
| Zinc oxide | 5 |

TABLE 16

| Materials | Parts by mass |
|---|---|
| Unvulcanized rubber composition 1 | 77 |
| Sulfur (trade name, Sulfax 200S; manufactured by Tsurumi Chemical Industry Co., Ltd.) | 1.2 |
| Tetrabenzylthiuram disulfide (trade name, TBZTD; manufactured by Sanshin Chemical Industry Co., Ltd.) | 4.5 |

2. Preparation of Elastic Roller

A primer (trade name, DY35-051; manufactured by Dow Corning Toray Co., Ltd.) was applied onto the circumferential surface of a stainless steel (SUS304) cylinder having a diameter of 6 mm, and was baked in an oven heated to a temperature of 180° C. for 20 minutes to prepare a substrate. This substrate and unvulcanized rubber composition 1 were fed to a crosshead extruder. An unvulcanized rubber elastic layer was formed on the substrate, and was heated in an oven heated to a temperature of 160° C. for 70 minutes to cure the unvulcanized rubber elastic layer. Subsequently, the surface of the elastic layer was polished with a rotary grinding wheel. Elastic roller 30 having a central diameter of 8.5 mm and its adjacent diameters of 8.4 mm was thereby prepared, the adjacent diameters being located 90 mm from the central portion of the roller toward both ends.

3. Formation of Intermediate Layer

The materials shown in Table 17 below were mixed by stirring. Next, methyl ethyl ketone was added such that the proportion of the total solid content was 30% by mass, and the materials were mixed with a sand mill. Methyl ethyl ketone was added to the mixed solution to adjust the viscosity to be 10 to 12 cps. A coating material for forming an intermediate layer was thus prepared.

TABLE 17

| Materials | Parts by mass |
|---|---|
| Kuraray Polyol C-3090 (trade name: manufactured by Kuraray Co., Ltd.) | 71.9 |
| Isocyanate group-terminated prepolymer B-1 | 28.1 |
| PEL-46 (manufactured by Japan Carlit Co., Ltd.) | 11.2 |
| Silica (trade name: AEROSIL 200; manufactured by Nippon Aerosil Co., Ltd.) | 15 |

In the next step, the elastic roller was immersed in the coating material for forming an intermediate layer to form a coating of the coating material on the surface of the elastic layer of the elastic roller, and the coating was dried at room temperature for 30 minutes. The coating was further subjected to a heat treatment at a temperature of 150° C. for 1 hour to form an intermediate layer having a thickness of 15 μm on the outer periphery of the elastic layer.

4. Formation of Surface Layer

The roller including the intermediate layer formed thereon was immersed in coating material D-2 for forming a surface layer in the same manner as in Example 1 to form a coating on the surface of the intermediate layer. The coating was cured to form a surface layer. Conductive roller 30 was thus prepared. The thickness of the surface layer was 148 nm.

5. Evaluation of Horizontal Streak Image Under H/H Environment

A cleaning blade as a cleaning unit for the transfer residual toner on the photosensitive member being mounted on a cyan toner cartridge for a laser printer (trade name: HP Color Laserjet Enterprise CP4515dn, manufactured by Hewlett-Packard Company) was removed. Conductive roller 30 as a charging roller was mounted. The cyan toner cartridge was installed in the laser printer, and was left to stand under the H/H environment for 2 hours. In the next step, a durability test was performed in which an E-letter image having a coverage rate of 0.5% relative to the area of paper of size A4 was continuously output. A halftone image (image of horizontal lines with a width of 1 dot and an interval of 2 dots drawn vertically to the rotational direction of the photoreceptor) was output after the 100th sheet having the E-letter image was output and after the 20000th sheet having the E-letter image was output. The halftone images on the two sheets were visually observed to evaluate the generation of horizontal streaks according to the following criteria. The results of evaluation of the halftone image output after the output of the 100th sheet of the image are shown in the "evaluation of the initial horizontal streak image," and the results of evaluation of the halftone image after the output of the 20000th sheet of the image are shown in the "evaluation of the horizontal streak image after the durability test."

Rank A: no horizontal streaks are found at all.
Rank B: horizontal streaks are slightly found only at the end of the image.
Rank C: remarkable horizontal streaks are generated in almost a half region of the image.

6. Measurement of Triboelectric Charging Quantity

Figure 7:
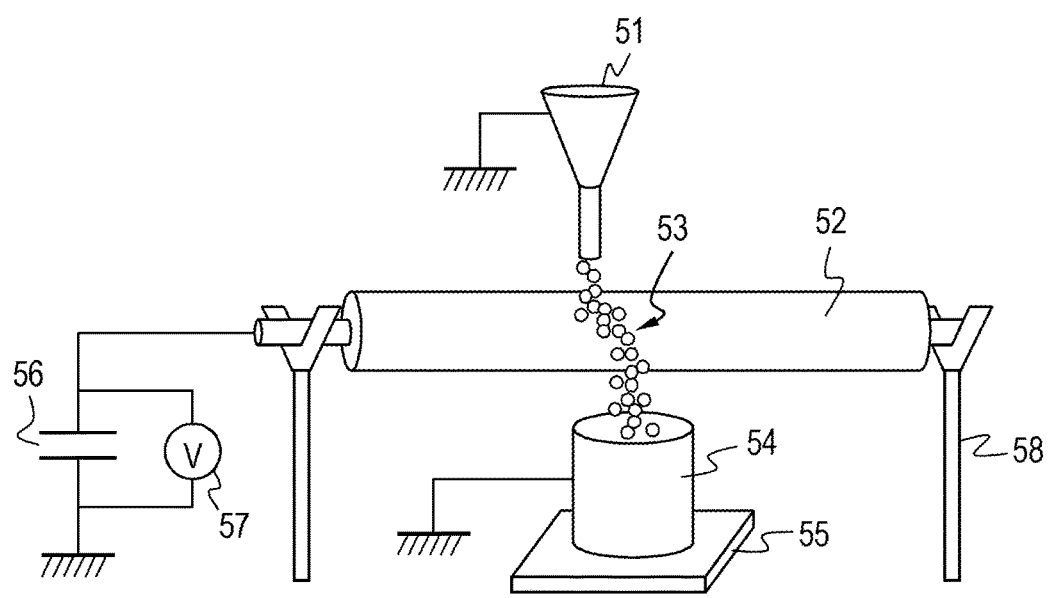
FIG. 7 is a schematic configurational diagram illustrating an apparatus for measuring the triboelectric charging quantity of a conductive roller.

Conductive roller 30 was left to stand under the H/H environment for 6 hours or longer. The triboelectric charging quantity was measured according to the following procedure. The measurement unit illustrated in FIG. 7 was connected to a cascade surface charge quantity measurement apparatus TS-100AT (trade name, manufactured by KYOCERA Chemical Corporation) for use. A charging roller 52 was placed on an insulating supporting rod 58. A carrier 53 was dropped from a powder inlet 51 for 10 seconds to be subjected to contact charging. The carrier used was a standard carrier N-01 (The Imaging Society of Japan). The total charge quantity of the carrier 53 dropped into a container 54 disposed on an insulating plate 55 was measured with an electrometer 57 connected to a capacitor 56 in parallel, and was defined as a charge quantity Q [μC]. Furthermore, the mass M (g) of the carrier dropped into the container 54 was measured. From these values, the charge quantity Q/M per unit mass (μC/g) was calculated. The value was defined as the "initial triboelectric charging quantity $w_1$ of the charging roller."

After the measurement of the initial triboelectric charging quantity of the roller, a durability test was performed on the roller in the same manner as in the evaluation of the horizontal streak image under the H/H environment. Subsequently, the charge quantity was measured in the same manner as in the measurement of the initial triboelectric charging quantity, and the value was defined as the "triboelectric charging quantity $w_2$ of the charging roller after the durability test." The value of $w_2/w_1$ was calculated, and was defined as the "charge quantity retention rate." The results of evaluation are shown in Table 19.

Examples 31 to 35

Conductive rollers 31 to 35 were prepared in the same manner as in Example 30 except that the polymer contained in the intermediate layer, the amount thereof used, and the coating material for forming a surface layer were varied as shown in Table 18, and were evaluated in the same manner as in Example 30. The results of evaluation are shown in Table 19.

Comparative Examples 10 to 13

Conductive rollers C10 to C12 were prepared in the same manner as in Example 30 except that the polymer contained in the intermediate layer, the amount thereof used, and the coating material for forming a surface layer were varied as shown in Table 18, and were evaluated in the same manner as in Example 30. In Comparative Example 13, conductive roller C13 was prepared in the same manner as in Example 30 except that the surface layer was not formed. The results of evaluation are shown in Table 19.

The charging rollers in Examples 30 to 35 did not generate horizontal streaks in the evaluation of the initial horizontal streak image and in the evaluation of the horizontal streak image after the durability test, and had good results. In contrast, the charging roller in Comparative Example 12 including the intermediate layer containing none of the structures represented by structural formulas (1), (2) and (3), horizontal streaks were slightly generated in the evaluation of the initial horizontal streak image, and horizontal streaks were generated in the evaluation of the horizontal streak image after the durability test. It is considered that these horizontal streaks resulted from a reduced charge quantity of the toner, to which a sufficient triboelectric charging quantity was not imparted by the charging roller. At a large charge quantity of the toner, a repulsive force will work between the toner and a charging roller having negative charge while at a small charge quantity of the toner, the repulsive force will weaken and the toner will adhere to the surface of the charging roller. For this reason, it is considered that a large amount of the toner adhered to the surface of the charging roller, generating horizontal streaks. In Comparative Example 10 including the surface layer having a small thickness, Comparative Example 11 in which the material for the surface layer was an acrylic resin, and Comparative Example 13 including no surface layer, horizontal streaks were generated in the evaluation of the horizontal streak image after the durability test.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-095346, filed, May 11, 2016 which is hereby incorporated by reference herein in its entirety.

TABLE 18

Preparation of conductive roller (charging roller)

| | Intermediate layer | | | Surface layer | | |
|---|---|---|---|---|---|---|
| | Polymer | | | Coating | | |
| | No. | Amount used (parts by mass) | Binder resin | material for forming surface layer | Solid content (% by mass) | Thickness after curing (nm) |
| Example 30 | B-1 | 3 | (Carbonate urethane) C-2090/C-1 | D-2 | 5 | 143 |
| Example 31 | B-9 | | | | | |
| Example 32 | B-1 | | | | 20 | 285 |
| Example 33 | | | | | 1 | 14 |
| Example 34 | B-10 | | | D-4 | 2 | 140 |
| Example 35 | B-11 | | | D-1 | 5 | 150 |
| Comparative Example 10 | B-1 | 3 | | D-2 | 0.1 | 4 |
| Comparative Example 11 | | | | D-5 | 1 | 140 |
| Comparative Example 12 | POLYMENT NK380 (NIPPON SHOKUBAI CO., LTD.) | | | D-2 | 5 | 153 |
| Comparative Example 13 | B-1 | | | — | — | — |

TABLE 19

Evaluation of charging roller

| | Initial horizontal streak image | Horizontal streak image after durability test | Initial triboelectric charging quantity (μC/g) | Triboelectric charging quantity after durability test (μC/g) | Charge quantity retention rate (after durability test/initial) |
|---|---|---|---|---|---|
| Example 30 | A | A | −4.1 | −3.8 | 0.93 |
| Example 31 | A | A | −3.9 | −3.5 | 0.90 |
| Example 32 | A | A | −4.0 | −3.8 | 0.95 |
| Example 33 | A | A | −4.2 | −4.0 | 0.95 |
| Example 34 | A | A | −3.3 | −3.0 | 0.91 |
| Example 35 | A | A | −3.4 | −3.1 | 0.91 |
| Comparative Example 10 | A | C | −4.2 | −2.6 | 0.62 |
| Comparative Example 11 | A | C | −2.6 | −2.2 | 0.85 |
| Comparative Example 12 | B | C | −2.7 | −2.4 | 0.89 |
| Comparative Example 13 | A | C | −4.1 | −2.4 | 0.59 |

What is claimed is:

1. An electrophotographic member, comprising:
a substrate;
an elastic layer on the substrate;
an intermediate layer covering a surface of the elastic layer, said intermediate layer comprising a binder resin and a polymer having at least one structure selected from the group consisting of formulae (1)-(3); and
a surface layer covering a surface of the intermediate layer, the surface layer containing silicon oxide and having a thickness of 10 to 300 nm

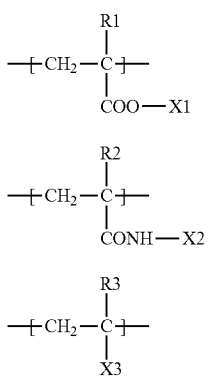

where R1 is a hydrogen atom or a methyl group,
R2 is a hydrogen atom or a methyl group,
R3 is a hydrogen atom or a methyl group,
X1 is selected from the group consisting of formulae (5) and (6),
X2 is selected from the group consisting of formulae (5) and (6),
X3 is selected from the group consisting of formulae (7) and (8)

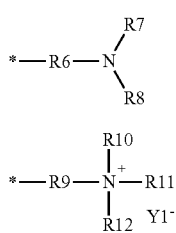

where R6 is a divalent hydrocarbon group having 1 to 4 carbon atoms,
R7 and R8 are independently a methyl group or an ethyl group,
R9 is a divalent hydrocarbon group having 1 to 4 carbon atoms,
R10, R11 and R12 are independently a hydrocarbon group having 1 to 18 carbon atoms,
* is a site of bonding to the structure represented by formulae (1) or (2), and $Y1^-$ is an anion;

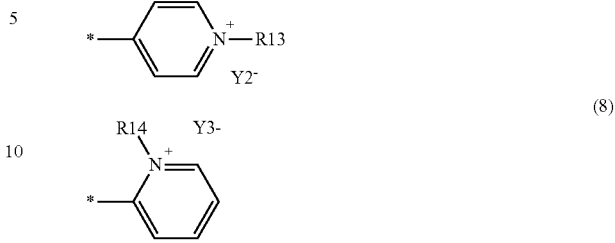

where R13 is a hydrocarbon group having 1 to 13 carbon atoms,
R14 is a hydrocarbon group having 1 to 13 carbon atoms,
* is a site of bonding to the structure represented by formula (3),
$Y2^-$ is an anion, and
$Y3^-$ is an anion.

2. The electrophotographic member according to claim 1, wherein the polymer further comprises a structure represented by formula (4) below:

where R4 is a hydrogen atom or a methyl group, and R5 is a hydrocarbon group having 1 to 18 carbon atoms.

3. The electrophotographic member according to claim 1 wherein the polymer has a structure selected from the group consisting of formulae (1) and (2), and X1 is represented by formula (5).

4. The electrophotographic member according to claim 1, wherein the silicon oxide is prepared from a polysilazane having a structural unit represented by formula (9)

where R15 and R16 are independently selected from the group consisting of a hydrogen atom, a methyl group, an ethoxy group and an aminopropyl group.

5. A process cartridge detachably attachable to a main body of an electrophotographic image forming apparatus, the process cartridge comprising an electrophotographic member, said electrophotographic member comprising:
a substrate;
an elastic layer on the substrate;
an intermediate layer covering a surface of the elastic layer, said intermediate layer comprising a binder resin and a polymer having at least one structure selected from the group consisting of formulae (1)-(3); and
a surface layer covering a surface of the intermediate layer, the surface layer containing silicon oxide and having a thickness of 10 to 300 nm

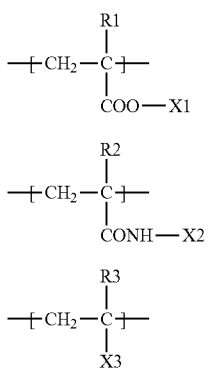

(1)
(2)
(3)

where R1 is a hydrogen atom or a methyl group,
R2 is a hydrogen atom or a methyl group,
R3 is a hydrogen atom or a methyl group,
X1 is selected from the group consisting of formulae (5) and (6),
X2 is selected from the group consisting of formulae (5) and (6),
X3 is selected from the group consisting of formulae (7) and (8)

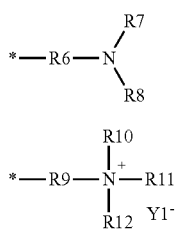

(5)
(6)

where R6 is a divalent hydrocarbon group having 1 to 4 carbon atoms,
R7 and R8 are independently a methyl group or an ethyl group,
R9 is a divalent hydrocarbon group having 1 to 4 carbon atoms,
R10, R11 and R12 are independently a hydrocarbon group having 1 to 18 carbon atoms,
* is a site of bonding to the structure represented by formulae (1) or (2), and
Y1⁻ is an anion;

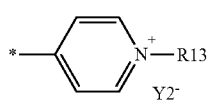

(7)

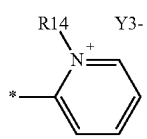

(8)

where R13 is a hydrocarbon group having 1 to 13 carbon atoms,

R14 is a hydrocarbon group having 1 to 13 carbon atoms,
* is a site of bonding to the structure represented by formula (3),
Y2⁻ is an anion, and
Y3⁻ is an anion.

6. An electrophotographic image forming apparatus comprising an electrophotographic member, said electrophotographic member comprising:
a substrate;
an elastic layer on the substrate;
an intermediate layer covering a surface of the elastic layer, said intermediate layer comprising a binder resin and a polymer having at least one structure selected from the group consisting of formulae (1)-(3); and
a surface layer covering a surface of the intermediate layer, the surface layer containing silicon oxide and having a thickness of 10 to 300 nm

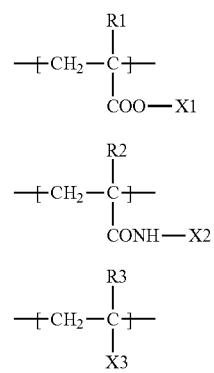

(1)
(2)
(3)

where R1 is a hydrogen atom or a methyl group,
R2 is a hydrogen atom or a methyl group,
R3 is a hydrogen atom or a methyl group,
X1 is selected from the group consisting of formulae (5) and (6),
X2 is selected from the group consisting of formulae (5) and (6),
X3 is selected from the group consisting of formulae (7) and (8)

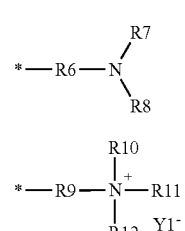

(5)
(6)

where R6 is a divalent hydrocarbon group having 1 to 4 carbon atoms,
R7 and R8 are independently a methyl group or an ethyl group,
R9 is a divalent hydrocarbon group having 1 to 4 carbon atoms,
R10, R11 and R12 are independently a hydrocarbon group having 1 to 18 carbon atoms,
* is a site of bonding to the structure represented by formulae (1) or (2), and Y1⁻ is an anion;

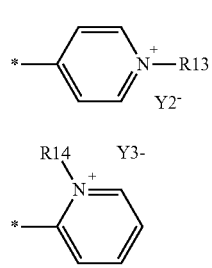

(7)

(8)

where R13 is a hydrocarbon group having 1 to 13 carbon atoms,
R14 is a hydrocarbon group having 1 to 13 carbon atoms,
* is a site of bonding to the structure represented by formula (3),
Y2⁻ is an anion, and
Y3⁻ is an anion.

7. The electrophotographic member according to claim 1, wherein the surface layer comprises a silicon oxide film.

8. The electrophotographic member according to claim 1, wherein the surface layer is obtained by applying a polysilazane containing solution on the surface of the intermediate layer, and converting the polysilazane to the silicon oxide.

* * * * *